US012408008B2

(12) United States Patent
Kobel et al.

(10) Patent No.: US 12,408,008 B2
(45) Date of Patent: *Sep. 2, 2025

(54) LOCAL FLEET CONNECTIVITY SYSTEM AND METHODS

(71) Applicant: Oshkosh Corporation, Oshkosh, WI (US)

(72) Inventors: Korry D. Kobel, Oshkosh, WI (US); Fredric L. Yutzy, Oshkosh, WI (US); Dan Adamson, Oshkosh, WI (US); Stefan Eshleman, Oshkosh, WI (US); Greg Pray, Oshkosh, WI (US); Patrick Booth, Oshkosh, WI (US); Brian Mohlman, Oshkosh, WI (US)

(73) Assignee: OSHKOSH CORPORATION, Oshkosh, WI (US)

( * ) Notice: Subject to any disclaimer, the term of this patent is extended or adjusted under 35 U.S.C. 154(b) by 806 days.

This patent is subject to a terminal disclaimer.

(21) Appl. No.: 17/576,408

(22) Filed: Jan. 14, 2022

(65) Prior Publication Data
US 2022/0229415 A1 Jul. 21, 2022

Related U.S. Application Data

(60) Provisional application No. 63/138,003, filed on Jan. 15, 2021, provisional application No. 63/138,015, (Continued)

(51) Int. Cl.
H04W 4/08 (2009.01)
B66F 9/06 (2006.01)
(Continued)

(52) U.S. Cl.
CPC ............... H04W 4/08 (2013.01); B66F 9/06 (2013.01); B66F 9/0755 (2013.01);
(Continued)

(58) Field of Classification Search
CPC ........... H04W 4/70; H04W 4/30; H04W 4/40; H04W 76/15; H04W 76/14; H04W 76/23; B66F 9/06
See application file for complete search history.

(56) References Cited

U.S. PATENT DOCUMENTS 3,009,747 A 11/1961 Pitzer
4,099,761 A 7/1978 Cullings
(Continued)

FOREIGN PATENT DOCUMENTS

CN 102756997 A 10/2012
CN 107426770 B 12/2017
(Continued)

OTHER PUBLICATIONS

Suzuki et al., "Teleoperation of Multiple Robots through the Internet", IEEE International Workshop on Robot and Human Communication, published 1996, pp. 84-89 (Year: 1996).
(Continued)

Primary Examiner — Benyam Haile
(74) Attorney, Agent, or Firm — FOLEY & LARDNER LLP

(57) ABSTRACT

A local fleet connectivity system includes a plurality of machines disposed at a location. Each of the plurality of machines includes an implement and a prime mover configured to drive the implement. The system includes at least one control module communicably coupled with a first machine of the plurality of machines. The system includes at least one connectivity module communicably coupled with the plurality of machines. The at least one control module is configured to establish, via the at least one connectivity module, a connection between the plurality of machines.
(Continued)

The at least one control module is configured to exchange, via the at least one connectivity module, data between the plurality of machines.

18 Claims, 15 Drawing Sheets

Related U.S. Application Data filed on Jan. 15, 2021, provisional application No. 63/137,955, filed on Jan. 15, 2021, provisional application No. 63/138,024, filed on Jan. 15, 2021, provisional application No. 63/137,893, filed on Jan. 15, 2021, provisional application No. 63/137,978, filed on Jan. 15, 2021, provisional application No. 63/137,950, filed on Jan. 15, 2021, provisional application No. 63/138,016, filed on Jan. 15, 2021, provisional application No. 63/137,867, filed on Jan. 15, 2021, provisional application No. 63/137,996, filed on Jan. 15, 2021.

(51) Int. Cl.

| | |
|---|---|
| *B66F 9/075* | (2006.01) |
| *B66F 9/12* | (2006.01) |
| *B66F 11/04* | (2006.01) |
| *G05B 19/4155* | (2006.01) |
| *G05D 1/00* | (2006.01) |
| *G05D 1/224* | (2024.01) |
| *G05D 1/225* | (2024.01) |
| *G05D 1/226* | (2024.01) |
| *G05D 1/692* | (2024.01) |
| *G05D 1/86* | (2024.01) |
| *G06F 3/0482* | (2013.01) |
| *G06F 3/0484* | (2022.01) |
| *G06F 3/0488* | (2022.01) |
| *G06Q 10/20* | (2023.01) |
| *G06Q 30/0251* | (2023.01) |
| *G06Q 30/0601* | (2023.01) |
| *G07C 5/00* | (2006.01) |
| *G07C 5/08* | (2006.01) |
| *G08B 3/00* | (2006.01) |
| *G08B 5/36* | (2006.01) |
| *G08B 7/06* | (2006.01) |
| *G08B 21/18* | (2006.01) |
| *H04L 67/52* | (2022.01) |
| *H04L 67/63* | (2022.01) |
| *H04W 4/029* | (2018.01) |
| *H04W 4/30* | (2018.01) |
| *H04W 4/40* | (2018.01) |
| *H04W 4/70* | (2018.01) |
| *H04W 8/00* | (2009.01) |
| *H04W 48/16* | (2009.01) |
| *H04W 76/14* | (2018.01) |
| *H04W 76/15* | (2018.01) |
| *H04W 76/23* | (2018.01) |
| *B66F 17/00* | (2006.01) |
| *G06F 16/93* | (2019.01) |
| *H04W 4/35* | (2018.01) |
| *H04W 4/80* | (2018.01) |
| *H04W 84/12* | (2009.01) |
| *H04W 84/18* | (2009.01) |
| *H04W 88/08* | (2009.01) |

(52) U.S. Cl.
CPC ............ *B66F 9/07581* (2013.01); *B66F 9/12* (2013.01); *B66F 11/046* (2013.01); *G05B 19/4155* (2013.01); *G05D 1/0022* (2013.01); *G05D 1/0027* (2013.01); *G05D 1/0044* (2013.01); *G05D 1/005* (2013.01); *G05D 1/224* (2024.01); *G05D 1/2246* (2024.01); *G05D 1/225* (2024.01); *G05D 1/226* (2024.01); *G05D 1/692* (2024.01); *G05D 1/86* (2024.01); *G06F 3/0482* (2013.01); *G06F 3/0484* (2013.01); *G06F 3/0488* (2013.01); *G06Q 10/20* (2013.01); *G06Q 30/0251* (2013.01); *G06Q 30/0611* (2013.01); *G06Q 30/0631* (2013.01); *G06Q 30/0641* (2013.01); *G07C 5/006* (2013.01); *G07C 5/0825* (2013.01); *G08B 3/00* (2013.01); *G08B 5/36* (2013.01); *G08B 7/06* (2013.01); *G08B 21/18* (2013.01); *H04L 67/52* (2022.05); *H04L 67/63* (2022.05); *H04W 4/029* (2018.02); *H04W 4/30* (2018.02); *H04W 4/40* (2018.02); *H04W 4/70* (2018.02); *H04W 8/005* (2013.01); *H04W 48/16* (2013.01); *H04W 76/14* (2018.02); *H04W 76/15* (2018.02); *H04W 76/23* (2018.02); *B66F 11/04* (2013.01); *B66F 17/006* (2013.01); *G05B 2219/45049* (2013.01); *G06F 16/93* (2019.01); *H04W 4/35* (2018.02); *H04W 4/80* (2018.02); *H04W 84/12* (2013.01); *H04W 84/18* (2013.01); *H04W 88/08* (2013.01); *H04W 88/085* (2013.01)

(56) References Cited

U.S. PATENT DOCUMENTS

| | | |
|---|---|---|
| 4,178,591 A | 12/1979 | Geppert |
| 4,315,652 A | 2/1982 | Barwise |
| 4,426,110 A | 1/1984 | Mitchell et al. |
| 4,461,608 A | 7/1984 | Boda |
| 4,572,567 A | 2/1986 | Johnson |
| 4,573,728 A | 3/1986 | Johnson |
| 4,810,020 A | 3/1989 | Powell |
| 5,026,104 A | 6/1991 | Pickrell |
| 5,092,731 A | 3/1992 | Jones et al. |
| 5,209,537 A | 5/1993 | Smith et al. |
| 5,330,242 A | 7/1994 | Lucky, Sr. |
| 5,730,430 A | 3/1998 | Hodson et al. |
| 5,919,027 A | 7/1999 | Christenson |
| 5,934,858 A | 8/1999 | Christenson |
| 5,934,867 A | 8/1999 | Christenson |
| 5,938,394 A | 8/1999 | Christenson |
| 5,951,235 A | 9/1999 | Young et al. |
| 5,967,731 A | 10/1999 | Brandt |
| 5,984,609 A | 11/1999 | Bartlett |
| 6,033,176 A | 3/2000 | Bartlett |
| 6,062,803 A | 5/2000 | Christenson |
| 6,089,813 A | 7/2000 | McNeilus et al. |
| 6,120,235 A | 9/2000 | Humphries et al. |
| 6,123,500 A | 9/2000 | McNeilus et al. |
| 6,210,094 B1 | 4/2001 | McNeilus et al. |
| 6,213,706 B1 | 4/2001 | Christenson |
| 6,224,318 B1 | 5/2001 | McNeilus et al. |
| 6,264,013 B1 | 7/2001 | Hodgins |
| 6,315,515 B1 | 11/2001 | Young et al. |
| 6,336,783 B1 | 1/2002 | Young et al. |
| 6,350,098 B1 | 2/2002 | Christenson et al. |
| 6,411,887 B1 | 6/2002 | Martens et al. |
| 6,447,239 B2 | 9/2002 | Young et al. |
| 6,474,928 B1 | 11/2002 | Christenson |
| 6,526,335 B1 | 2/2003 | Treyz et al. |
| 6,565,305 B2 | 5/2003 | Schrafel |
| 6,611,755 B1 | 8/2003 | Coffee et al. |
| 6,993,421 B2 | 1/2006 | Pillar et al. |
| 7,070,382 B2 | 7/2006 | Pruteanu et al. |
| 7,207,610 B1 | 4/2007 | Kauppila |
| 7,284,943 B2 | 10/2007 | Pruteanu et al. |
| 7,398,137 B2 | 7/2008 | Ferguson et al. |
| 7,556,468 B2 | 7/2009 | Grata |
| 7,559,735 B2 | 7/2009 | Pruteanu et al. |

(56) References Cited

U.S. PATENT DOCUMENTS

| | | |
|---|---|---|
| 7,721,857 B2 | 5/2010 | Harr |
| 7,878,750 B2 | 2/2011 | Zhou et al. |
| 7,934,758 B2 | 5/2011 | Stamey et al. |
| 8,182,194 B2 | 5/2012 | Pruteanu et al. |
| 8,215,892 B2 | 7/2012 | Calliari |
| 8,360,706 B2 | 1/2013 | Addleman et al. |
| 8,514,058 B2 | 8/2013 | Cameron |
| 8,533,604 B1 | 9/2013 | Parenti et al. |
| 8,540,475 B2 | 9/2013 | Kuriakose et al. |
| 8,655,505 B2 | 2/2014 | Sprock et al. |
| 8,807,613 B2 | 8/2014 | Howell et al. |
| 8,833,823 B2 | 9/2014 | Price et al. |
| 9,028,193 B2 | 5/2015 | Goedken |
| 9,216,856 B2 | 12/2015 | Howell et al. |
| 9,387,985 B2 | 7/2016 | Gillmore et al. |
| 9,523,582 B2 | 12/2016 | Chandrasekar et al. |
| 9,624,033 B1 | 4/2017 | Price et al. |
| 9,694,776 B2 | 7/2017 | Nelson et al. |
| 9,880,581 B2 | 1/2018 | Kuriakose et al. |
| 9,886,565 B2 | 2/2018 | Nielsen et al. |
| 9,981,803 B2 | 5/2018 | Davis et al. |
| 10,018,171 B1 | 7/2018 | Breiner et al. |
| 10,035,648 B2 | 7/2018 | Haddick et al. |
| 10,196,205 B2 | 2/2019 | Betz et al. |
| 10,221,012 B2 | 3/2019 | Hund, Jr. |
| 10,311,526 B2 | 6/2019 | Takeda |
| 10,373,087 B1 | 8/2019 | Yang et al. |
| 10,457,533 B2 | 10/2019 | Puszkiewicz et al. |
| 10,663,955 B2 | 5/2020 | Kuikka |
| 10,796,577 B2 | 10/2020 | Katou et al. |
| 10,798,113 B2 | 10/2020 | Muddu et al. |
| 10,899,538 B2 | 1/2021 | Nelson et al. |
| 10,913,428 B2 | 2/2021 | Dingli |
| 10,977,943 B1 | 4/2021 | Hayward |
| 11,252,149 B1 | 2/2022 | Bang et al. |
| 11,493,903 B2 | 11/2022 | Cella et al. |
| 11,888,853 B2 | 1/2024 | Childress et al. |
| 11,948,019 B1 | 4/2024 | Singh et al. |
| 12,130,780 B2 | 10/2024 | Nishii |
| 12,200,783 B2 | 1/2025 | Kopchinsky et al. |
| 2002/0070862 A1 | 6/2002 | Francis et al. |
| 2002/0079713 A1 | 6/2002 | Moilanen et al. |
| 2002/0123345 A1 | 9/2002 | Mahany et al. |
| 2003/0158640 A1 | 8/2003 | Pillar et al. |
| 2004/0114557 A1 | 6/2004 | Bryan et al. |
| 2005/0002354 A1 | 1/2005 | Kelly et al. |
| 2005/0140154 A1 | 6/2005 | Vigholm et al. |
| 2005/0149920 A1 | 7/2005 | Patrizi et al. |
| 2006/0132323 A1 | 6/2006 | Grady |
| 2007/0130296 A1 | 6/2007 | Kim |
| 2007/0213869 A1 | 9/2007 | Bandringa et al. |
| 2009/0005928 A1 | 1/2009 | Sells et al. |
| 2009/0049441 A1 | 2/2009 | Mii et al. |
| 2009/0088924 A1 | 4/2009 | Coffee et al. |
| 2009/0099897 A1 | 4/2009 | Ehrman et al. |
| 2009/0101447 A1 | 4/2009 | Durham et al. |
| 2010/0179844 A1 | 7/2010 | Lafergola et al. |
| 2010/0271191 A1 | 10/2010 | De Graff et al. |
| 2011/0010023 A1 | 1/2011 | Kunzig et al. |
| 2011/0040440 A1 | 2/2011 | De Oliveira et al. |
| 2011/0081193 A1 | 4/2011 | Nilsson |
| 2012/0001876 A1 | 1/2012 | Chervenka et al. |
| 2012/0046809 A1 | 2/2012 | Wellman |
| 2013/0057007 A1 | 3/2013 | Howell et al. |
| 2013/0127611 A1 | 5/2013 | Bernstein et al. |
| 2013/0132140 A1 | 5/2013 | Amin et al. |
| 2013/0240300 A1 | 9/2013 | Fagan et al. |
| 2014/0214240 A1 | 7/2014 | Funke et al. |
| 2014/0241332 A1 | 8/2014 | Yang et al. |
| 2014/0278621 A1* | 9/2014 | Medwin ............ G06Q 10/0631 705/7.12 |
| 2014/0312639 A1 | 10/2014 | Petronek |
| 2015/0185716 A1 | 7/2015 | Wichmann et al. |
| 2015/0310674 A1 | 10/2015 | Humphrey et al. |
| 2015/0376869 A1* | 12/2015 | Jackson ............... E02F 9/2054 701/2 |
| 2016/0052762 A1 | 2/2016 | Swift |
| 2016/0057004 A1 | 2/2016 | Ge |
| 2016/0121490 A1 | 5/2016 | Ottersland |
| 2016/0208992 A1 | 7/2016 | Parsons |
| 2016/0221816 A1 | 8/2016 | Pollock et al. |
| 2016/0272471 A1 | 9/2016 | Jaipaul |
| 2016/0304051 A1 | 10/2016 | Archer et al. |
| 2016/0318438 A1 | 11/2016 | Wadell |
| 2016/0371433 A1 | 12/2016 | Polesskiy et al. |
| 2017/0149901 A1 | 5/2017 | Condeixa et al. |
| 2017/0167088 A1 | 6/2017 | Walker et al. |
| 2017/0169631 A1 | 6/2017 | Walker et al. |
| 2017/0269608 A1 | 9/2017 | Chandrasekar et al. |
| 2017/0270490 A1 | 9/2017 | Penilla et al. |
| 2017/0289121 A1 | 10/2017 | Harwell |
| 2017/0291805 A1 | 10/2017 | Hao et al. |
| 2017/0301210 A1 | 10/2017 | King et al. |
| 2018/0065544 A1 | 3/2018 | Brusco |
| 2018/0143734 A1 | 5/2018 | Ochenas et al. |
| 2018/0150885 A1 | 5/2018 | Albinger et al. |
| 2018/0151037 A1 | 5/2018 | Morgenthau et al. |
| 2018/0164993 A1 | 6/2018 | Zummo et al. |
| 2018/0234266 A1 | 8/2018 | Rudolph et al. |
| 2018/0335903 A1 | 11/2018 | Coffman et al. |
| 2019/0033172 A1 | 1/2019 | Montemurro et al. |
| 2019/0156394 A1 | 5/2019 | Karmakar |
| 2019/0180354 A1 | 6/2019 | Greenberger et al. |
| 2019/0246060 A1 | 8/2019 | Tanabe et al. |
| 2019/0376459 A1 | 12/2019 | Pieczko et al. |
| 2020/0014759 A1 | 1/2020 | Wunderlich |
| 2020/0065433 A1 | 2/2020 | Duff et al. |
| 2020/0134955 A1 | 4/2020 | Kishita |
| 2020/0183362 A1 | 6/2020 | Ledwith et al. |
| 2020/0207166 A1 | 7/2020 | Froehlich |
| 2020/0298801 A1 | 9/2020 | Dingli |
| 2020/0317489 A1 | 10/2020 | Bhatia et al. |
| 2021/0023985 A1 | 1/2021 | Stadnyk |
| 2021/0055178 A1 | 2/2021 | Hinderling et al. |
| 2021/0056771 A1 | 2/2021 | Federle |
| 2021/0087035 A1 | 3/2021 | Yip et al. |
| 2021/0090363 A1 | 3/2021 | Ramos et al. |
| 2021/0211852 A1 | 7/2021 | Ramalho De Oliveira et al. |
| 2021/0232137 A1 | 7/2021 | Whitfield et al. |
| 2021/0250178 A1 | 8/2021 | Herman et al. |
| 2022/0025611 A1 | 1/2022 | Kandula et al. |
| 2022/0035364 A1 | 2/2022 | Laclef et al. |
| 2022/0156921 A1 | 5/2022 | Humpston et al. |
| 2022/0221365 A1 | 7/2022 | Mahurkar et al. |
| 2022/0229415 A1 | 7/2022 | Kobel et al. |
| 2022/0229431 A1 | 7/2022 | Kobel et al. |
| 2022/0230224 A1 | 7/2022 | Kobel et al. |
| 2022/0230488 A1 | 7/2022 | Kobel et al. |
| 2022/0232649 A1 | 7/2022 | Kobel et al. |
| 2023/0224680 A1 | 7/2023 | Kobel et al. |
| 2023/0247390 A1 | 8/2023 | Kobel et al. |
| 2024/0073651 A1 | 2/2024 | Kobel et al. |
| 2024/0089708 A1 | 3/2024 | Kobel et al. |
| 2024/0235931 A1 | 7/2024 | Nolan et al. |

FOREIGN PATENT DOCUMENTS

| | | |
|---|---|---|
| CN | 207608281 U | 7/2018 |
| CN | 111126522 A | 5/2020 |
| DE | 10 2007 020 182 A1 | 10/2008 |
| DE | 10 2018 217 716 A1 | 5/2019 |
| EP | 1 136 433 A2 | 9/2001 |
| EP | 2 886 507 A1 | 6/2015 |
| EP | 3 112 312 A1 | 1/2017 |
| EP | 3 173 369 A1 | 5/2017 |
| EP | 3 200 482 A1 | 8/2017 |
| EP | 3 896 024 A1 | 10/2021 |
| EP | 4 048 842 B1 | 8/2022 |
| JP | H08-282995 A | 10/1996 |
| JP | H1059698 A | 3/1998 |
| JP | 2016-159996 A | 9/2016 |
| JP | 2020-128270 A | 8/2020 |
| JP | 2021-052920 A | 4/2021 |

(56) References Cited

FOREIGN PATENT DOCUMENTS

| WO | WO-01/30671 A2 | 5/2001 |
|----|----------------|--------|
| WO | WO-2011/019872 A2 | 2/2011 |
| WO | WO-2012/109444 A2 | 8/2012 |
| WO | WO-2020/121613 A1 | 6/2020 |

OTHER PUBLICATIONS

International Search Report and Written Opinion issued in connection with PCT Appl. Ser. No. PCT/US2022/012610 dated Jun. 21, 2022 (19 pages).
Invitation to Pay Additional Fees issued in connection with PCT Appl. Ser. No. PCT/US2022/012610 dated Apr. 28, 2022 (136 pages).
Invitation to Pay Additional Fees issued in connection with PCT Appl. Ser. No. PCT/US2022/012628 dated May 13, 2022 (134 pages).
Notification of Transmittal of the International Search Report and the Written Opinion of the International Search Authority, or the Declaration issued in connection with PCT Appl. Ser. No. PCT/US2022/012603 dated Jul. 6, 2022 (27 pages).
Notification of Transmittal of the International Search Report and the Written Opinion of the International Search Authority, or the Declaration issued in connection with PCT Appl. Ser. No. PCT/US2022/012628 dated Jul. 6, 2022 (27 pages).

\* cited by examiner

LOCAL FLEET CONNECTIVITY SYSTEM AND METHODS

CROSS-REFERENCE TO RELATED PATENT APPLICATIONS

This application claims the benefit of and priority to U.S. Provisional Application No. 63/137,950, filed on Jan. 15, 2021, U.S. Provisional Application No. 63/137,955, filed on Jan. 15, 2021, U.S. Provisional Application No. 63/137,996, filed on Jan. 15, 2021, U.S. Provisional Application No. 63/138,003, filed on Jan. 15, 2021, U.S. Provisional Application No. 63/138,015, filed on Jan. 15, 2021, U.S. Provisional Application No. 63/138,016, filed on Jan. 15, 2021, U.S. Provisional Application No. 63/138,024, filed on Jan. 15, 2021, U.S. Provisional Application No. 63/137,867, filed on Jan. 15, 2021, U.S. Provisional Application No. 63/137,893, filed on Jan. 15, 2021, and U.S. Provisional Application No. 63/137,978, filed on Jan. 15, 2021, all of which are hereby incorporated by reference herein.

BACKGROUND

Work equipment such as lifts and telehandlers sometimes require tracking, tasking, monitoring, and servicing at a work site. Managers and operators of work equipment typically rely on discrete systems, applications, and methods to perform these functions for each piece of equipment.

SUMMARY

One exemplary embodiment relates to a local fleet connectivity system including a plurality of machines disposed at a location. Each of the plurality of machines includes an implement and a prime mover configured to drive the implement. The system includes at least one control module communicably coupled with a first machine of the plurality of machines. The system includes at least one connectivity module communicably coupled with the plurality of machines. The at least one control module is configured to establish, via the at least one connectivity module, a connection between the plurality of machines. The at least one control module is configured to exchange, via the at least one connectivity module, data between the plurality of machines.

Another exemplary embodiment relates to a method including establishing, by at least one control module via at least one connectivity module, a connection between a plurality of machines disposed at a location. The method includes connecting, by the at least one control module via the at least one connectivity module, the plurality of machines. The method includes exchanging, by the at least one control module via the at least one connectivity module, data between the plurality of machines. Each of the plurality of machines includes an implement and a prime mover to drive the implement.

Another exemplary embodiment relates to a non-transitory computer readable medium having computer-executable instructions embodied therein that, when executed by a processor of the control module, cause the control module to perform operations including establishing, via at least one connectivity module, a connection between a plurality of machines disposed at a location. The operations include exchanging, via the at least one connectivity module, data between the plurality of machines. Each of the plurality of machines includes an implement and a prime mover to drive the implement.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Figure 1:
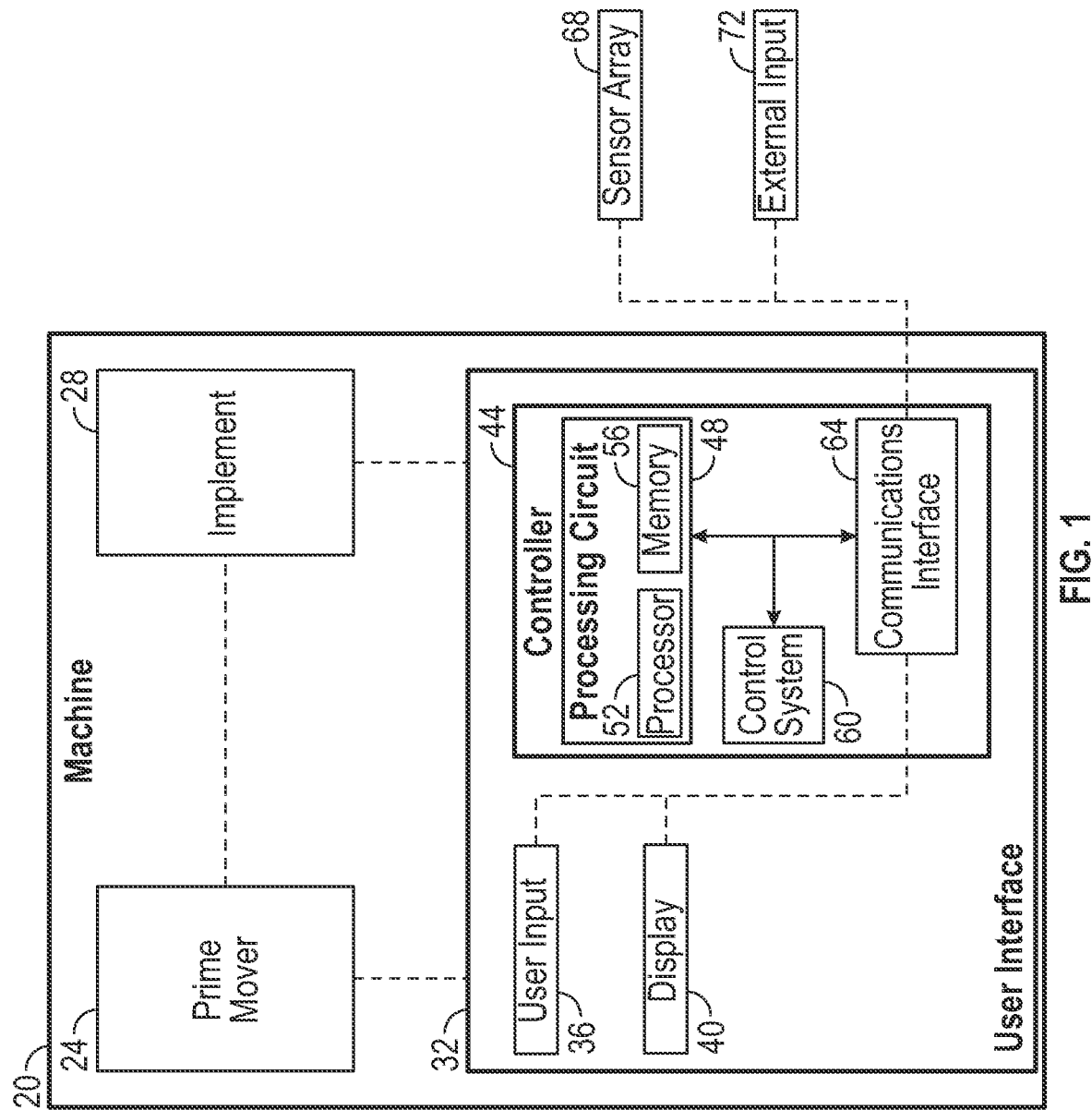
FIG. 1 is a schematic representation of a work machine including a machine control module according to an exemplary embodiment.

Managers and operators of work equipment typically rely on discrete systems, applications, and methods to perform functions for each piece of equipment. It is therefore desirable to provide a means to electronically connect work equipment on a work site and integrate tracking, tasking, monitoring, and service support functions on a common local fleet connectivity platform to improve efficiency and reduce costs.

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

One exemplary implementation of the present disclosure relates to a local fleet connectivity system (e.g., an interactivity and productivity tool for local fleet connectivity). The local fleet connectivity system may include a network of communicatively connected work machines. Network connections between work machines and other nodes connected to the system may include low energy wireless data networks, mesh networks, satellite communications networks, cellular networks, or wireless data networks. In some implementations, the network of work machines may be a local fleet connectivity system initiated by automatic exchange of networking messages between different machines in the plurality of communicatively connected work machines. In some implementations, a network node is associated with each machine in the plurality of networked machines. In some implementations, a first machine extends a connection to a second machine in proximity to the first machine on a work site to establish a network link at the work site. A work site network may be established among a fleet of work machines at the work site where machines connect with other nearby machines in a mesh network. In some implementations, network access is enabled according to one or more access codes. Access to machine-specific data for one or more machines connected to the network is provided according to the one or more access codes. In some implementations, interconnectivity and productivity related data is exchanged via connectivity modules. The connectivity module may be communicatively connected to a machine controller. The connectivity module may be a self-contained unit. The controller may host one or more interconnectivity and productivity applications. The one or more connectivity and productivity applications hosted by the plurality of controllers may be local instances of a remotely hosted master interconnectivity and productivity application. Connectivity modules may connect to and interconnect through a connectivity hub. In some examples, the connectivity hub may be a device located at a work site that connects to work machines in proximity to the hub via a local network (e.g. a wireless mesh network). In other examples, the connectivity hub may be a remote server.

Referring to the figures generally, various exemplary embodiments disclosed herein relate to systems and methods for a local fleet connectivity system to enhance interactivity and productivity of fleets of work machines on work sites. For example, Bluetooth Low Energy (BLE) Machine to Machine (M2M) communication protocols may be used to expand communication at a work site/jobsite via a local fleet connectivity system. In a further example, physical coding sublayer internet protocol (PCS IP) coded instructions (e.g. applications) are used to provide interfaces between work machine software applications in various formats (e.g. MAC, PMA, etc.) and other devices (e.g. mobile user devices). PCS IP may be used, for example, in media independent local fleet connectivity applications within the local fleet connectivity system. In another example, the local fleet connectivity system uses Bluetooth Low Energy (BLE) Machine to Machine (M2M) communication protocols at a work site/jobsite to generate and exchange machine driven notifications in a highly efficient and very low error rate by sharing a mesh network. In traditional work site information systems, these notifications are human driven notifications requiring a human operator to physically generate a message and command transmission. As such, traditional work site information systems are inefficient and prone to human error. In another example, machines communicate across a wireless mesh network (e.g. a BLE M2M network) by sending messages across nodes that are created by different machines. One machine may extend a connection with one nearby machine to a network of machines to connect to various machines across a work site. Machines and users may access machine-specific data from those machines that are associated with a common code (e.g. a customer key, identification information, etc.) if accessed using one type of access account (e.g. a customer account with access to all work machines operated by that customer) or access machine-specific data from all of the connected machines if accessed using another type of access account (e.g. a manufacturer account with access to all machines produced by that manufacturer). In a further example, the local fleet connectivity system may provide work site network masking and visibility by means of asset keys to ensure system security and data confidentiality. In another example, the local fleet connectivity system may determine generation and routing of machine generated push messages. These messages may be routed to specific machines based on system-determined or user input criteria.

In the embodiments described, work machines function as micro eco-systems within a macro eco-system. An eco-system may operate at the level of a work site, a collection of work sites supervised by a business unit, a collection of machines operated by a business at multiple sites, a population of machines manufactured by an original equipment manufacturer and operated at many sites by different operators, a business enterprise including many machines from different manufactures supported and monitored by different providers but all interconnected by a common fleet interactivity and productivity platform enabled by interoperable data collection/communications/control/indicator devices provided to each machine in the eco-system. In the embodiments described, the interoperable data collection/communications/control/indicator devices provide near (e.g. at a work site) and far (e.g. remote fleet management node) connectivity and services. Near connectivity and services may include, for example, machine location, machine to machine meshing, service interactions, etc. Far connectivity and services may include, for example, fleet management, incident notification, asset control and status including time and geo-location fencing.

In some implementations, the local fleet connectivity system provides an array of products and functions to improve productivity and reduce ownership costs based on a very high degree of automated machine to machine connectivity that enables exchanges of data and commands and analysis of fleet data that are not possible with traditional work machine tracking, management, telematics systems. For example, the disclosed local fleet connectivity system may create work site ad hoc fleets, automatically check in and check out equipment from a rental or other fleet management application, wirelessly connect with machine components and systems, including machine databuses, to diagnose and troubleshoot faults, remotely determine machine health, functional, and operational status, perform data analytics for user (e.g. users interacting with the system via user devices) and machines connected to the system, and locate individual machines and fleets of machines on any work site at any time.

As shown in FIG. 1, a machine, shown as work machine 20 (e.g., a telehandler, a boom lift, a scissor lift, etc.) includes a prime mover 24 (e.g., a spark ignition engine, a compression ignition engine, an electric motor, a generator set, a hybrid system, etc.) structured to supply power to the work machine 20, and an implement 28 driven by prime mover 24. The implement 28 may be any component of the work machine 20 configured to be moved or controlled by the prime mover 24. In some embodiments, the implement 28 is a lift boom, a scissor lift, a telehandler arm, etc.

A user interface 32 is arranged in communication with the prime mover 24 and the implement 28 to control operations of the work machine 20. The user interface 32 includes a user input 36 that allows a machine operator to interact with the user interface 32, a display 40 for communicating to the machine operator (e.g., a display screen, a lamp or light, an audio device, a dial, or another display or output device), and a control module 44.

As the components of FIG. 1 are shown to be embodied in the work machine 20, the controller 44 may be structured as one or more electronic control units (ECU). The controller 44 may be separate from or included with at least one of an implement control unit, an exhaust after-treatment control unit, a powertrain control module, an engine control module, etc. In some embodiments, the control module 44 includes a processing circuit 48 having a processor 52 and a memory device 56, a control system 60, and a communications interface 64. Generally, the control module 44 is structured to receive inputs and generate outputs for or from a sensor array 68 and external inputs or outputs 72 (e.g. a load map, a machine-to-machine communication, a fleet management system, a user interface, a network, etc.) via the communications interface 64.

The control system 60 generates a range of inputs, outputs, and user interfaces. The inputs, outputs, and user interfaces may be related to a jobsite, a status of a piece of equipment, environmental conditions, equipment telematics, an equipment location, task instructions, sensor data, equipment consumables data (e.g. a fuel level, a condition of a battery), status, location, or sensor data from another connected piece of equipment, communications link availability and status, hazard information, positions of objects relative to a piece of equipment, device configuration data, part tracking data, text and graphic messages, weather alerts, equipment operation, maintenance, and service data, equipment beacon commands, tracking data, performance data, cost data, operating and idle time data, remote operation commands, reprogramming and reconfiguration data and commands, self-test commands and data, software as a service data and commands, advertising information, access control commands and data, onboard literature, machine software revision data, fleet management commands and data, logistics data, equipment inspection data including inspection of another piece of equipment using onboard sensors, prioritization of communication link use, predictive maintenance data, tagged consumable data, remote fault detection data, machine synchronization commands and data including cooperative operation of machines, equipment data bus information, operator notification data, work machine twinning displays, commands, and data, etc.

The sensor array 68 can include physical and virtual sensors for determining work machine states, work machine conditions, work machine locations, loads, and location devices. In some embodiments, the sensor array includes a GPS device, a LIDAR location device, inertial navigation, or other sensors structured to determine a position of the equipment 20 relative to locations, maps, other equipment, objects or other reference points.

In one configuration, the control system 60 is embodied as machine or computer-readable media that is executable by a processor, such as processor 52. As described herein and amongst other uses, the machine-readable media facilitates performance of certain operations to enable reception and transmission of data. For example, the machine-readable media may provide an instruction (e.g., command, etc.) to, e.g., acquire data. In this regard, the machine-readable media may include programmable logic that defines the frequency of acquisition of the data (or, transmission of the data). The computer readable media may include code, which may be written in any programming language including, but not limited to, Java or the like and any conventional procedural programming languages, such as the "C" programming language or similar programming languages. The computer readable program code may be executed on one or more processors, and either local or remote processors. In the latter scenario, the remote processors may be connected to each other through any type of network (e.g., CAN bus, etc.).

In another configuration, the control system 60 is embodied as hardware units, such as electronic control units. As such, the control system 60 may be embodied as one or more circuitry components including, but not limited to, processing circuitry, network interfaces, peripheral devices, input devices, output devices, sensors, etc. In some embodiments, the control system 60 may take the form of one or more analog circuits, electronic circuits (e.g., integrated circuits (IC), discrete circuits, system on a chip (SOCs) circuits, microcontrollers, etc.), telecommunication circuits, hybrid circuits, and any other type of "circuit." In this regard, the control system 60 may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on). The control system 60 may also include programmable hardware devices such as field programmable gate arrays, programmable array logic, programmable logic devices or the like. The control system 60 may include one or more memory devices for storing instructions that are executable by the processor(s) of the control system 60. The one or more memory devices and processor(s) may have the same definition as provided below with respect to the memory device 56 and processor 52. In some hardware unit configurations, the control system 60 may be geographically dispersed throughout separate locations in the machine. Alternatively, and as shown, the control system 60 may be embodied in or within a single unit/housing, which is shown as the controller 44.

In some embodiments, the control module 44 includes the processing circuit 48 having the processor 52 and the memory device 56. The processing circuit 48 may be structured or configured to execute or implement the instructions, commands, and/or control processes described herein with respect to control system 60. The depicted configuration represents the control system 60 as machine or computer-readable media. However, as mentioned above, this illustration is not meant to be limiting as the present disclosure contemplates other embodiments where the control system 60, or at least one circuit of the control system 60, is configured as a hardware unit. All such combinations and variations are intended to fall within the scope of the present disclosure.

The hardware and data processing components used to implement the various processes, operations, illustrative logics, logical blocks, modules and circuits described in connection with the embodiments disclosed herein (e.g., the processor 52) may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, or state machine. A processor also may be implemented as a combination of computing devices, such as a combination of a DSP and a microprocessor, a plurality of microprocessors, one or more microprocessors in conjunction with a DSP core, or any other such configuration. In some embodiments, the one or more processors may be shared by multiple circuits (e.g., control system 60 may include or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. All such variations are intended to fall within the scope of the present disclosure.

The memory device 56 (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory device 56 may be communicably connected to the processor 52 to provide computer code or instructions to the processor 52 for executing at least some of the processes described herein. Moreover, the memory device 56 may be or include tangible, non-transient volatile memory or non-volatile memory. Accordingly, the memory device 56 may include database components, object code components, script components, or any other type of information structure for supporting the various activities and information structures described herein.

Figure 2:
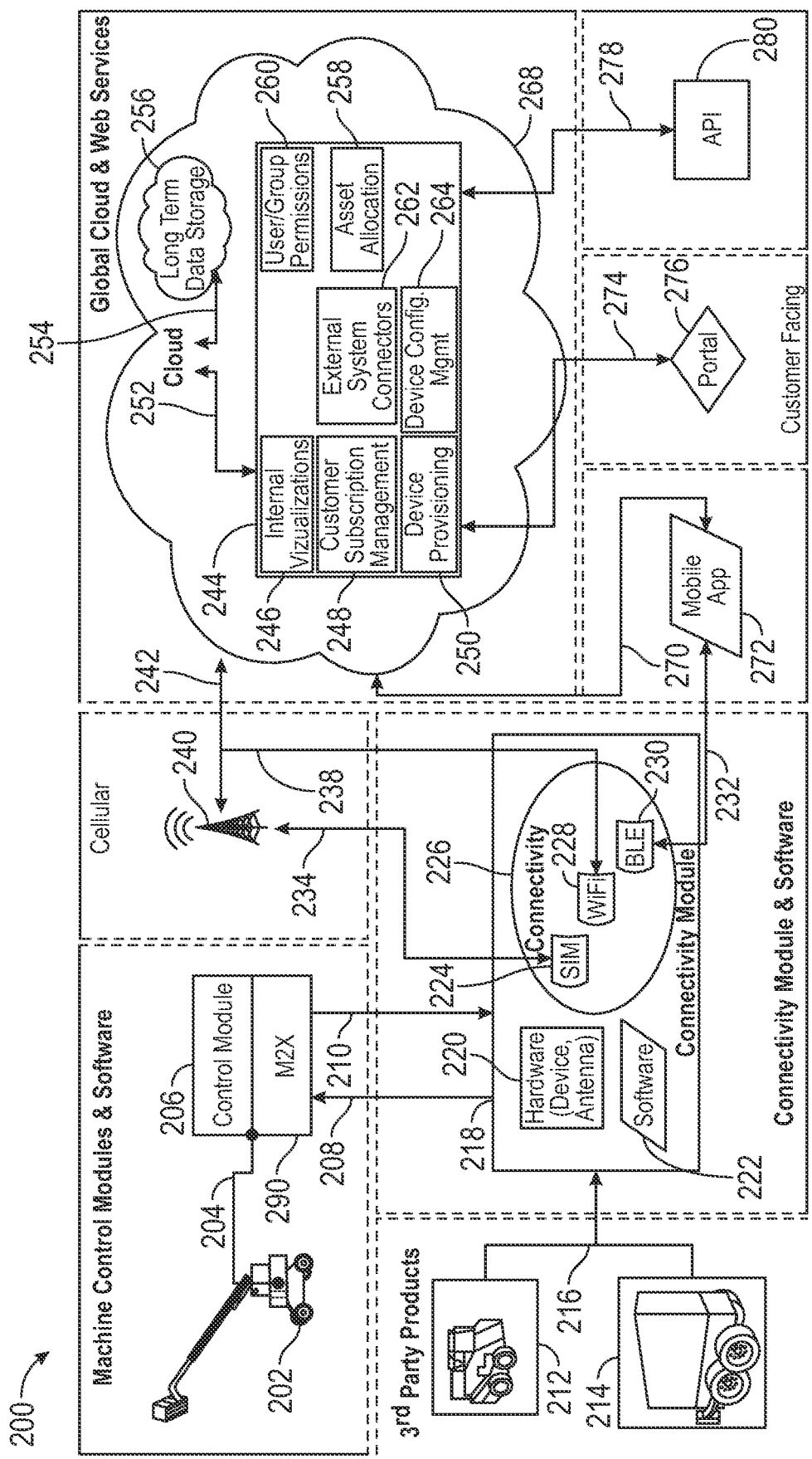
FIG. 2 is a schematic representation of a local fleet connectivity system, according to an exemplary embodiment.

As shown in FIG. 2, a local fleet connectivity system 200 may include one or more work machines 202, each with a control module 206, one or more connectivity modules 218, and one or more network devices hosting, for example, user interfaces 272, network portals 276, application interfaces/application programming interfaces 280, data storage systems 256, cloud and web services, and product development tool and application hubs 244.

The work machine 202 is communicably connected to a control module 206 via a connection 204. Connectivity between the work machine 202 and the control module 206 may be wired or wireless thus providing the flexibility to integrate the control module with the work machine 202 or to temporarily attach the control module 206 to the work machine 202. The control module 202 may be configured or may be reconfigurable in both hardware and software to interface with a variety of work machines 202, 212, 214. The control module 206 may include an integral power source or may draw power from the work machine 202 or another external source of power. Control modules 206 may be installed on or connected to products (e.g. third party products) 212, 214 not configured by the original product manufacturer with a control module 206.

The work machine 202 communicably connects to the local fleet connectivity system 200 via a machine-to-X (M2X) module 290. The M2X module 290 is communicably connected to the control module 206. The M2X module 290 establishes one or more communications channels 208, 210 with a connectivity module 218. The connectivity module 218 provides a plurality of links between one or more work machines 202, 212, 214 and the local fleet connectivity system 200. The local fleet connectivity system applications run by the M2X modules 290 or control modules 206 on one or more work machines 202 to exchange commands, codes (e.g. a customer key) and data between work machines 202, 212, 214, and user devices 272 via the connectivity module 218 to form a network of interconnections among machines, devices, or nodes. Each machine and device connected to the local fleet connectivity system 200 may establish an individual node. Data is exchanged between the different machines and devices by sending the data across the various nodes. For example, a first machine 202 may connect to a second machine 202 that is disposed proximate to the first machine 202. The second machine 202 may be connected to a third machine 202 which may be connected to a fourth machine 202, and so on. Data may be exchanged between any and all of the machines 202 through the various connections via at least one connectivity module 218. Connections between machines and user devices in the local fleet connectivity system 200 may, for example, be provided by a wireless mesh network.

The connectivity module 218 includes hardware 220, further including antennas, switching circuits, filters, amplifiers, mixers, and other signal processing devices for a plurality of wavelengths, frequencies, etc., software hosted on a non-volatile memory components 222, and a communications manager 226. The communications manager 226 includes processing circuits with communications front ends 224, 228, and 230 for one or more signal formats and waveforms including, for example, Bluetooth, Bluetooth low energy, WiFi, cellular, optical, and satellite communications. The connectivity module 218 may function as a gateway device connecting work machine 202 to other work machines 202, 212, 214, other network devices, remote networks 244, 272, 276, and 280, beacons, scheduling or other fleet management and coordination systems.

In some embodiments, the control module 44 of a machine is configured to automatically establish a link (e.g., communicably connect) between various machines 202 and other devices (e.g., user device 272) to each other via at least one connectivity module 218. For example, a control module 44 associated with a machine 202 may be configured to detect other machines, devices, and systems that are capable of communicably connecting to the machine 202 via the connectivity module 218. For example, a first machine 202 may be disposed at a location. A sensor from the sensor array 68 of the first machine 202 may be able to detect at least one other machine 202, 212, 214 disposed at the location (e.g., intercept or sense a signal from other machines indicating their proximity, etc.). In some embodiments, the sensor may detect a plurality of other machines 202, 212, 214. In some embodiments, the first machine may be programmed to connect with any machine it detects. In other embodiments, the first machine may be programmed to only connect with machines of a certain classification. A classification may be any identifiable characteristic of a machine. For example, the classification may be a type of machine (e.g., boom lift, scissor lift, etc.), a phase of a project for which the machine is being used for (e.g., Phase I, Phase II, etc.), a load capacity of the machine (e.g., machines with a load capacity under a predetermined threshold, etc.), a manufacturer of the machine, an operator of a machine, a classification code provided to the machine, a location of the machine, etc. The control module 44 of the first machine 202 may identify the classifications of the detected machines by receiving data indicative of the classification from each of the detected machines via a connectivity module 218. The control module 44 may determine which of the classifications of the detected machines match the classification of the first machine 202 by comparing the classifications of the detected machines with the classification of the first machine 202. Responsive to determining which of the detected machines have matching classifications, the control module 44 may link the first machine 202 with those detected machines. For example, the first machine 202 may be used for Phase II of a project, and the first machine 202 may be programmed to only link with other machines being used for the same phase. Therefore, the control module 44 may be configured o connect the first machine 202 with other detected machines that are also being used for Phase II of the project. In another example, the first machine 202 may be disposed on work site A and may be programmed to only link with other machines disposed on work site A. Therefore, based on the geographic boundaries of work site A and the locations of the detected machines, the control module may be configured to connect the first machine 202 with those detected machines disposed within work site A.

The local fleet connectivity system 200 may communicably connect a plurality of work machines with each other such that data, signals, commands, etc. can be exchanged amongst the machines. The connections between the machines may be established via a mesh network. The mesh network may persist regardless of machines, and other devices, arriving at and leaving from a work site. For example, a local fleet connectivity system 200 may comprise a mesh network connecting a plurality of work machines together that are disposed at a work site. The connectivity between the machines persists even when one of the plurality of work machines leaves the work site or a new work machine comes to the work site. The mesh connecting the plurality of machines may be persistent and constant. The mesh may also be continuously changing to accommodate additional machines or devices or to remove certain machines or devices. In some embodiments, the mesh may remain active such that data may be exchanged at any moment between the plurality of machines. In other embodiments, the mesh may be programmed to only provide connections between the machines at certain times (e.g., during working hours, etc.) or only between certain machines. The mesh may remain active when connecting only work machines. In other embodiments, the mesh may include other devices (e.g., user devices, etc.) between which data may be exchanged.

The local fleet connectivity system 200 provides connectivity between work machines 202, 212, 214 and remotely hosted user interfaces 272, network portals 276, application interfaces/application programming interfaces 280, data storage systems 256, cloud and web services 268, and product development tool and application hubs 244 that function as an Internet of Things (IoT) system for operation, control, and support of work machines 202, 212, 214 and users of work machines. For example, a plurality of work machines 202, 212, 214 disposed at a location that are connected to each other may be configured to connect to at least one user device by the control module 44 via the connectivity module 218. The user device may be disposed at the location or may be disposed at a remote location. Any connections between the machines, the user device, or other network devices, including connections 232, 234, 238, 242, 252, 254, 270, 274, and 278 between nodes connected to the local fleet connectivity system 200, may include, for example, cellular networks, or other existing or new means of digital connectivity. The links between the machines and devices enables data to be exchanged between the plurality of machines 202, 212, 214 and the user device. The local fleet connectivity system 200 allows for the coordination of multiple machines 202, 212, 214 within the same work site, or fleet wide control. For example, a work machine 202 may remotely report the results of a self-inspection to a user via a user device 272.

Product development tool and application hubs 244 may include tools and applications for internal visualizations 246, customer subscription management 248, device provisioning 250, external systems connectors 262, device configuration management 264, user/group permissions 260, asset allocation 258, fleet management, compliance, etc.

According to an exemplary embodiment, within the local fleet connectivity system 200, the control module 44 is configured to receive, via the connectivity module 218, a command from another network device (e.g., a user device). For example, a user of the user device may want a machine 202 to move from a first position to a second position (e.g., move from a first location to a second location, move from an inactive/storage position to an active/operational position, etc.). The control module 44 may receive a command indicating the task of moving from the first position to the second position from the user device via the connectivity module 218. Responsive to receiving the command, the control module 44 may activate the machine to perform the task.

In another embodiment, the control module 44 may be configured to determine that the machine 202 is not capable of performing the task indicated by the command. For example, the control module 44 may be configured to determine a battery level is too low, a part of the machine is broken or missing, the machine is not equipped to perform the task (e.g., the boom of the boom lift is not long enough, the load of the task exceeds the load capacity of the machine, etc.), etc. For example, to detect a low batter level, the control module 44 may be configured to receive a low voltage or no voltage indicating that the machine has no, or too little, power. To detect a load exceeds the load capacity of the machine, the control module 44 may be configured to receive an indication from a sensor (e.g., a pressure sensor) that the pressure applied to the machine 202 is above the predetermine load capacity. Other sensors on the machine 202 may indicate when a part is broken or missing.

Responsive to determining the machine 202 is not capable of performing the task indicated by the command, the control module 44 may be configured to generate a notification indicating the machine is not capable of performing the task. The notification may include details regarding the specific machine (e.g., machine number, time spent at the location, specific location of machine at the location, load capacity, etc.). The notification may include details regarding the task indicated by the command. The notification may include details regarding why the machine is not capable of performing the task (e.g., broken parts, wrong machine, low battery, etc.). If the machine malfunctioned (broken part, low battery, parts aren't moving properly, etc.), the notification may include instructions on how to fix the problem, which part needs repair, where to buy a replacement part, etc. The control module 44 may be configured to transmit the notification to a user device, or other network device, to notify a user of the inability to perform the task.

In some embodiments, the control module 44, via the connectivity module 218, may be configured to identify a different machine that is capable of performing the task indicated by the command. For example, the control module 44 may be configured to receive data from a second machine 202 indicating all parts are functioning properly (e.g., data from a self-inspection from the second machine 202), the battery is fully charged, the load capacity exceeds the load of the task, etc. The control module 44 may be configured to recommend the second machine 202 as a replacement for the first machine 202 to the user device. In another embodiment, the control module 44 may be able to automatically send, via the connectivity module 218, the command to the second machine 202.

In another embodiment, when the control module 44 determines a machine 202 is malfunctioning, the control module 44 may be configured to designate the machine 202 as inoperable. Based on the designation, the control module 44 may be configured to actuate a visual indicator (e.g., a light, a beacon, etc.). The visual indicator may be indicative of an inoperable state. In some embodiments, a specific visual indicator may correspond to a specific malfunction. For example, the control module 44 may be configured to change a color of a light, change a pulse of the light, change the number of lights, etc. based on what caused the malfunction. For example, a steady red light may indicate a low battery and a flashing red light may indicate a broken part.

In some embodiments, when a machine 202 is designated as inoperable, the machine 202 may be removed from the location. The control module 202 may be configured to determine that the machine 202 is no longer at the location. For example, the control module 44 may have a GPS system that can determine when the machine 202 is no longer at the site. Upon removal, the control module 44 may be configured to disconnect the machine from the other machines at disposed at the location.

According to another exemplary embodiment, within the local fleet connectivity system 200, the control module 44 is configured to receive, via the connectivity module 218, a request from a network device (e.g., a user device) to access machine-specific data corresponding to a plurality of linked machines. In some embodiments, the machine-specific data provided to the network device responsive to receiving the request is limited based on the machine or based on the type of data. For example, a user may have access to only a subset of the plurality of machines. The control module 44 may be configured to identify at least one of the plurality of machines is associated with the user based on an access indicator included in the request. The access indicator may be any information indicative of an association of the machine with the user. For example, the access indicator may be an access code, a customer key, user credentials (user name and password), identification information, the type of account being used (e.g., customer account, manufacturer account, technician account, etc.), etc. Memory device 56 of the control module 44 may be configured to store instructions regarding which machines are associated with which access indicator. The control module 44 may be configured to compare the access indicator received via the request with the instructions stored in the memory device 56 to determine which machine-specific data to provide to the user device. Upon identification of which machines are associated with the access indicator, the control module 44, via the connectivity module 218, may be configured to provide machine-specific data corresponding to the identified machines to the user device.

In another example, a user may have access to all of the plurality of machines, but only to specific information. For example, a customer may only have access to current data (e.g., e.g., current battery level, current location on a job site, current authorized operators, etc.). A manufacturer may have access to all data, including current data and historical data (e.g., average battery life, previous jobs completed, results of previously-performed self-inspections, etc.). Similar to the example above, the control module 44 may be configured to identify a subset of the machine-specific data that is associated with an access indicator that is included in the request and provide that subset of machine-specific data to the user device.

Figure 3:
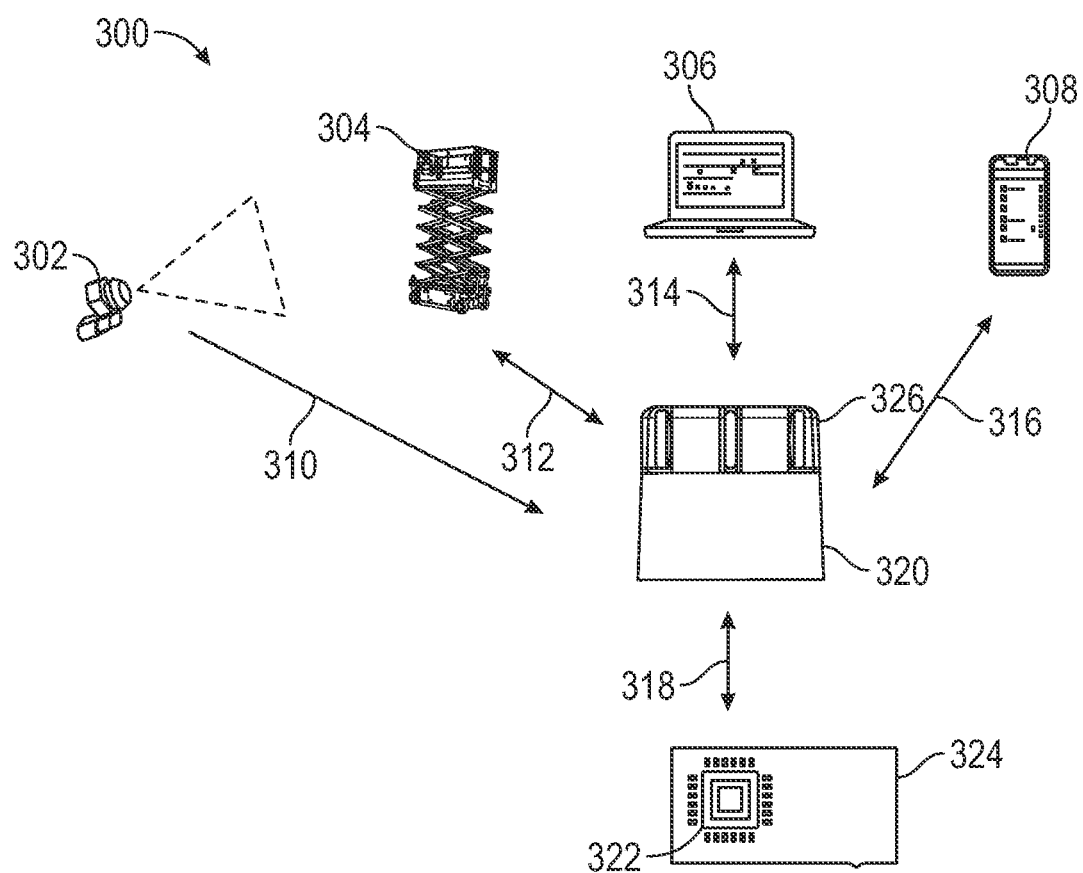
FIG. 3 is a schematic representation of a local fleet connectivity system with a central connectivity module, according to an exemplary embodiment.

FIG. 3 shows a local fleet connectivity system 300, according to an exemplary embodiment. As shown in FIG. 3, the connectivity module 320 functions as a communications interface between the control system 322 of the work machine 324 and other elements connected to the local fleet connectivity system 200. The connectivity module 320 may be part of the work machine 324 or may be physically coupled with the work machine 324. In some embodiments, the connectivity module 320 includes a beacon, shown as light 326. The connectivity module 320 may exchange commands and data 318 with the control system 322, sensor data 310 with auxiliary sensors 302, machine data 312 with another machine 304, commands and data 314 with a node or portal 306, and commands and data 316 with a user device 308 running an application for the local fleet connectivity system 300.

Any of the data 310, 312, 314, 316, 318 exchanged between the various connected devices and the connectivity module 320 may be further exchanged with other connected devices. For example, sensor data 310 from the auxiliary sensors 302 may be received by the connectivity module 320 and then further transmitted to the user device 308 such that a user of the user device 308 can see what the auxiliary sensor 302 detected. In response to viewing the data via the user device 308, the user can provide a command via the user device 308 that can be received by the connectivity module 320 and further transmitted to the device being commanded. For example, a sensor 302 may detect that the battery of the work machine 304 is getting low. The sensor 302 may send the low battery reading to the connectivity module 320 which is further transmitted to the user device 308. Upon receiving the indication of the lower battery, the user may command the work machine 304 to return to its storing orientation (e.g., collapsed state). The command may be sent to the work machine 304 via the connectivity module 320. Any of the devices 302, 304, 306, 308, 324 may communicate with each other via the communication module 320.

The local fleet connectivity system 200 allows for the coordination of multiple machines 324, 304 within the same work site, or a fleet wide control. For example, if a first work machine 304 is required to accomplish a task collaboratively with a second work machine 324, a user interacting with a user device 308 may provide commands to the first work machine 304 and second work machine 324 to execute the task in collaboration.

Figure 4:
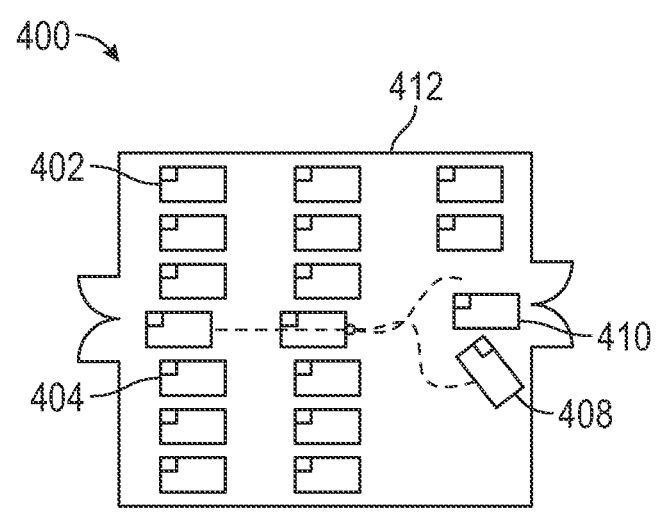
FIG. 4 is a schematic representation of a work site and equipment staging area with a local fleet connectivity system deployed, according to an exemplary embodiment.

Referring now to FIG. 4, a fleet connectivity system 400 is shown, according to an exemplary embodiment. As discussed above, the fleet connectivity system 400 may be deployed at a work site 412 to control a fleet of work machines 402, 404, 408, 410, so as to collaboratively perform tasks requiring more than one work machine 408, 410. For example, a user may wish to move the work machine 410 from its stored position on the left of the work site 412 out the door on the right of the work site. Components of the fleet connectivity system 400 (e.g., a network access point, a system access point, a connectivity hub, work machines having a connectivity module, etc.) may communicate with both the work machine 408 and the work machine 410, causing the work machine 408 to move out of the way of the work machine 410, so that the work machine 410 can move past the work machine 408 and out the doorway.

Figure 5:
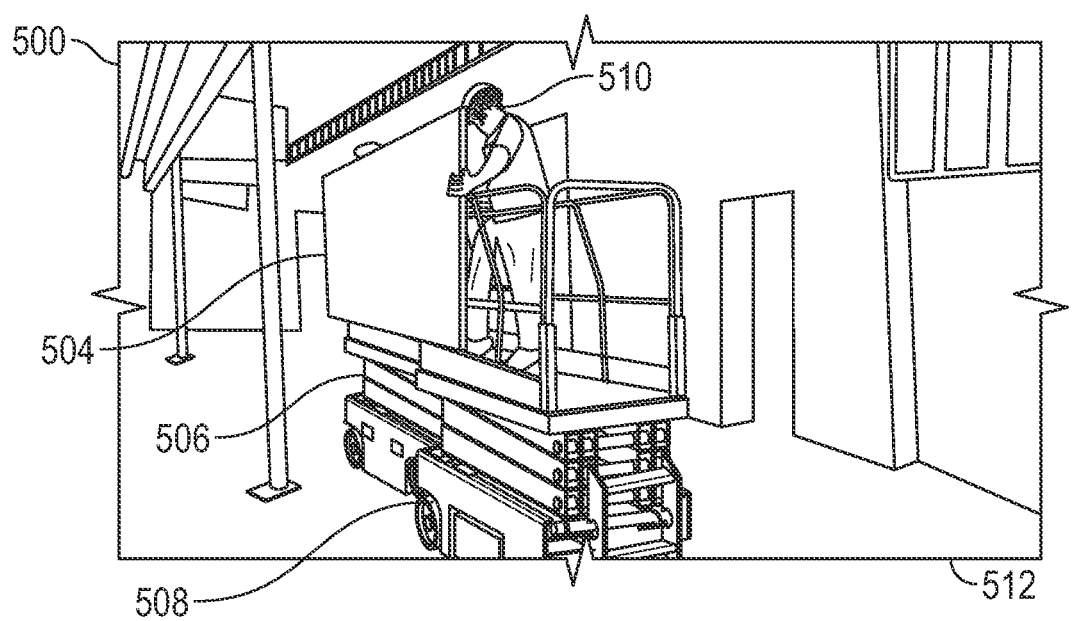
FIG. 5 is a picture representation of a work site with a local fleet connectivity system connecting two pieces of equipment, according to an exemplary embodiment.

Referring now to FIG. 5, a fleet connectivity system 500 is shown, according to an exemplary embodiment. As discussed above, the fleet connectivity system 500 may be communicably coupled to a plurality of work machines 506, 508 (e.g., via a plurality of connectivity modules), such that the work machines 506, 508 may collaboratively perform tasks on a jobsite 512. For example, as shown in FIG. 5 the fleet connectivity system 500 may be used to replace a section of drywall 504 that is too large to be handled by a single work machine 508. Components of the fleet connectivity system 500 (e.g., a network access point, a system access point, a connectivity hub, etc.) may communicate with both the work machine 506 and the work machine 508, and cause them to move at the same speed and in the same direction so that a user 510 on each work machine 506, 508 may hold the drywall 504 while the work machines 506, 508 are moving. In this regard, communication between components of the fleet connectivity system and the work machines 506, 508 may prevent the work machines 506, 508 from being separated so that the users 510 do not drop the drywall 504.

Figure 6:
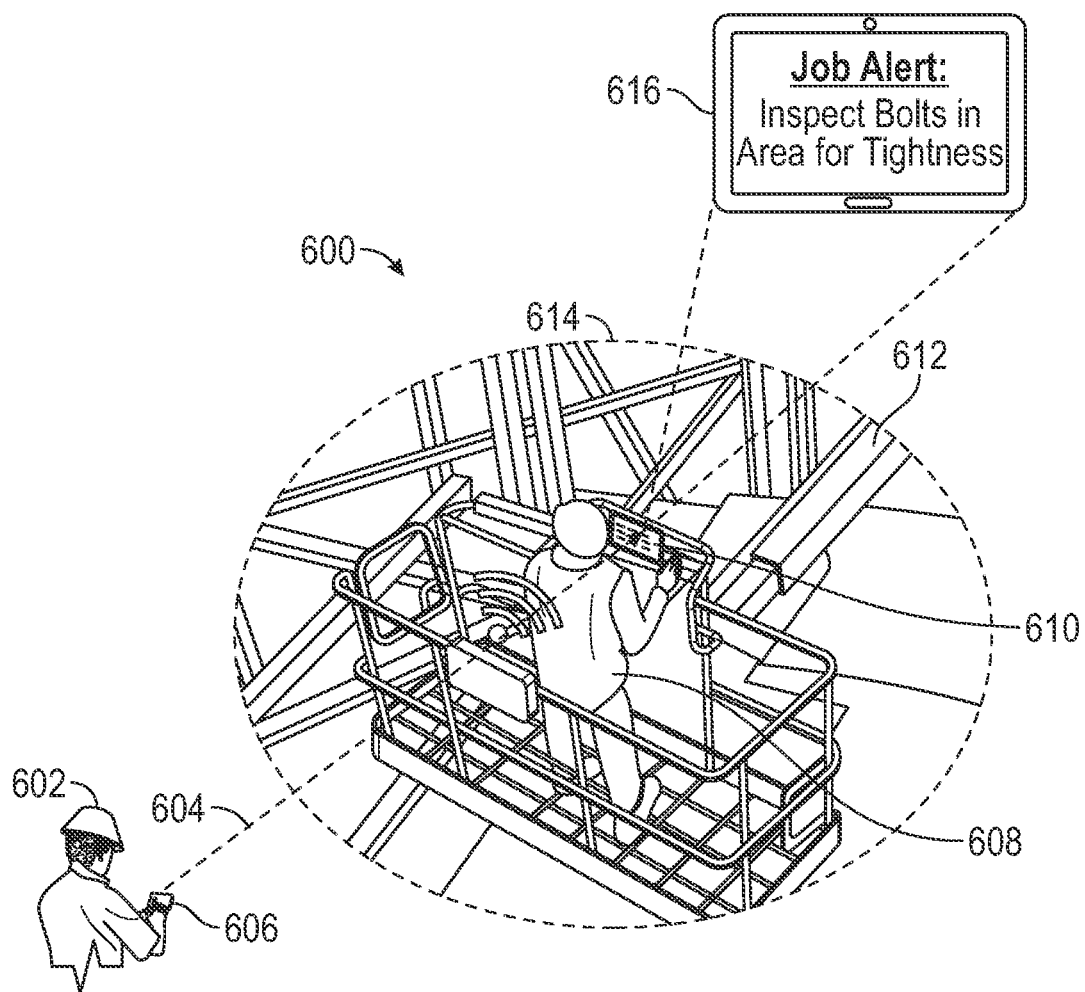
FIG. 6 is a picture representation of a piece of equipment with a local fleet connectivity system providing connectivity to a remote user, according to an exemplary embodiment.

As shown in FIG. 6, a remote user 602 of a local fleet connectivity system 600 can send messages and data 604 from a remote device 606 to an onsite user 608 on a jobsite 614. The messages and data 604 may be received by the control system 610 of a work machine 612 via a connectivity module and displayed via a user interface on an onboard display 616. The remote user 608 may send work instructions to the onsite user 608, informing the onsite user 608 of talks to be performed using the work machine 612. For example, as shown in FIG. 6, the remote user 602 may send instructions to the onsite user 608 to use the work machine 612 to inspect bolt tightness in the area. The instructions may displayed for the onsite user 608 on the onboard display 616. This allows the onsite user 608 to receive and view the instructions without the need to call the remote user 602 or write the instructions down. Because the work machine 612 is connected to the remote device 606 (e.g., via a connectivity module 218) the remote user 602 may receive the location of the work machine 612, as well as other work machines on the jobsite 614, and may use the location information to determine the instructions to send.

Figure 7:
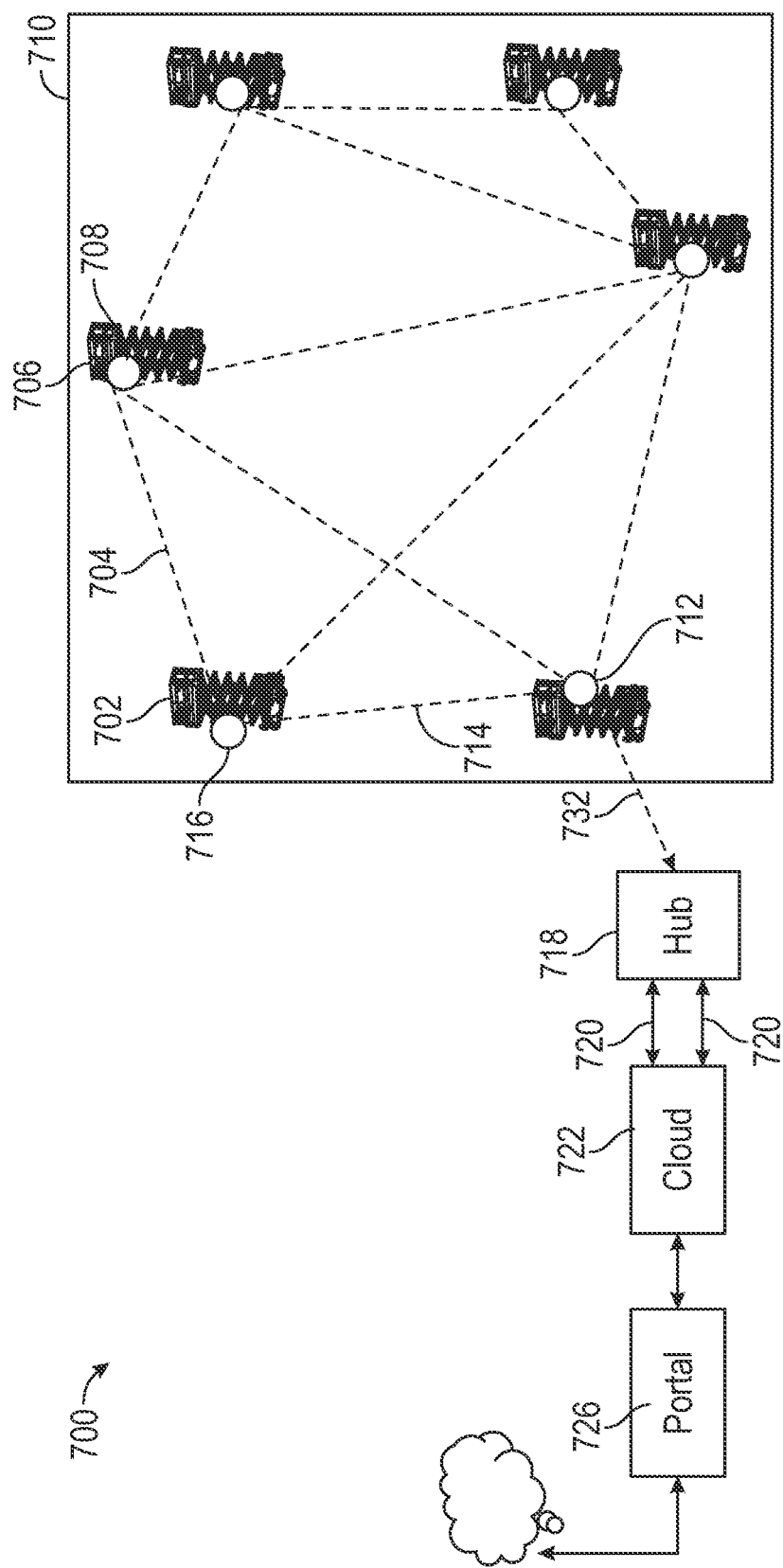
FIG. 7 is a schematic representation of a work site with a local fleet connectivity system deployed with connectivity to offsite systems, according to an exemplary embodiment.

As shown in FIG. 7, a local fleet connectivity system 700 includes a connectivity hub 718, according to an exemplary embodiment. In some embodiments, the connectivity hub 718 includes a connectivity module 218. In some embodiments, the connectivity hub 718 is configured to communicatively connect with one or more connectivity module equipped machines 702, 706 in proximity to the connectivity hub 718. In some embodiments, the connectivity hub 718 is configured to broadcast a work site identification signal. In some embodiments, the connectivity hub 718 is configured to connect work site machines 702, 706 connected to the local fleet network to an external internet feed 720. In some configurations, the connectivity hub 718 is configured as a gateway to one or more communications systems or network systems to enable exchanges of data between nodes 708, 712, 716 on the work site 710 local fleet connectivity network 704, 714, 732 and nodes 722, 726 external to the work site.

In some embodiments, connectivity hub 718 has a connectivity module 218 to (a) provide the functionalities described herein in place of or in addition to a machine that has a connectivity module 218, (b) broadcast a site identifier, or (c) connect to an external internet to flow data to and from the jobsite that is provided across the mesh.

Figure 8:
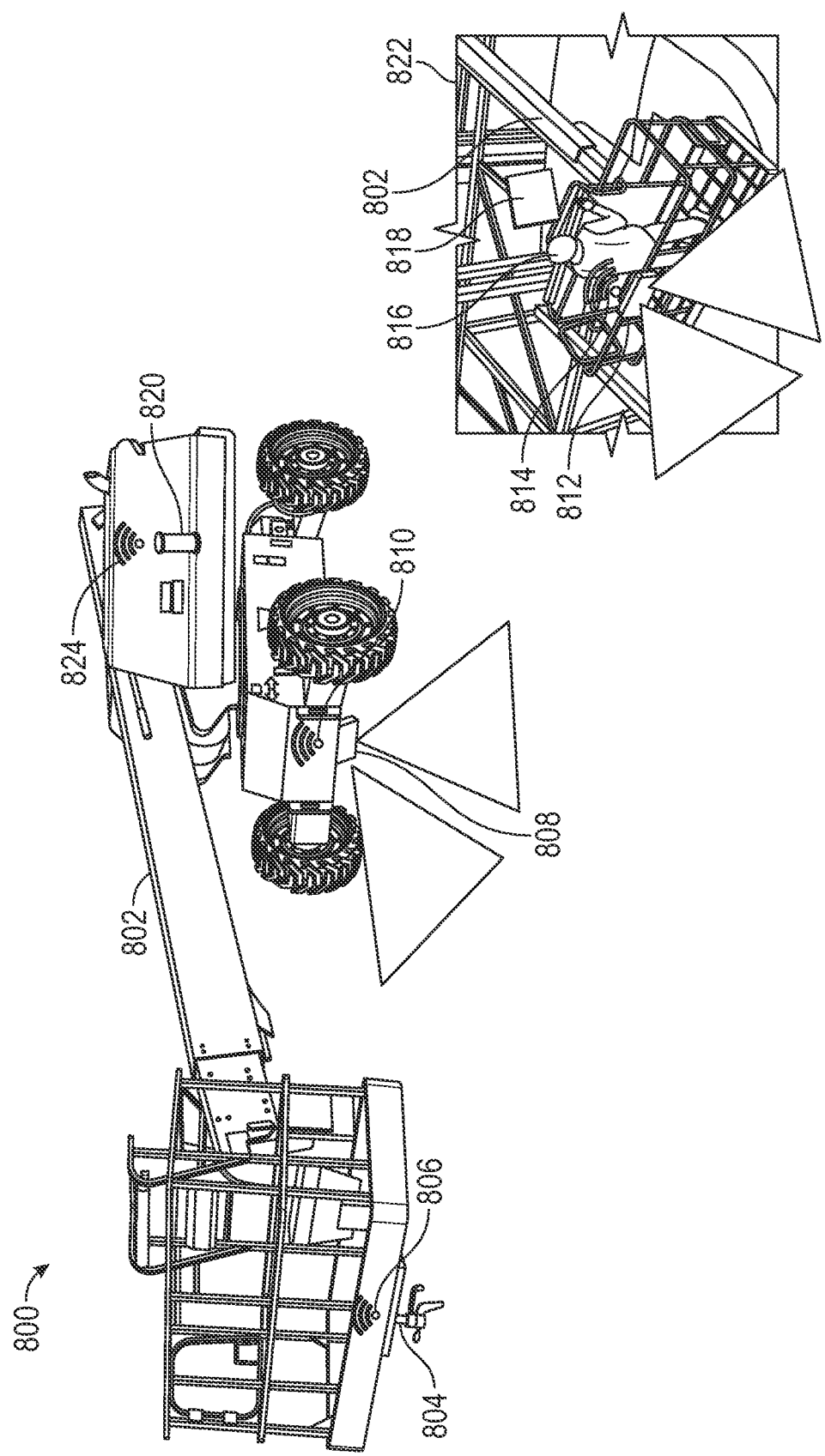
FIG. 8 is a picture representation of an apparatus configured with a local fleet connectivity system, according to some embodiments.

Referring to FIG. 8, a local fleet connectivity system 800 is shown, according to an exemplary embodiment. Sensors 804, 808, 812, 820 may be coupled to a work machine 802 on a jobsite 822. The sensors 804, 808, 812, 820 may be, for example, object detection sensors, environmental sensors (e.g., wind speed, temperature sensors), and tagged consumable sensors. The sensors 804, 808, 812, 820 may be connected to and may send data via the local fleet connectivity system 800 via wireless connections 806, 810, 814, 824. The sensor data may be displayed or may be used to generate messages for display on an onboard display 818 for a user 816 of the work machine 802. The onboard display 818 may receive the sensor data via a direct wired or wireless connection to the sensors. Alternatively the sensors may communicate with the onboard display through the local fleet connectivity system 800 (e.g., via a connectivity module 218). Sensor data from various work machines may be combined to map the jobsite 822 and to determine if environmental conditions are safe for using the work machines. Sensor data from the tagged consumable sensors 820 may be used to determine, for example, when tagged consumables must be replaced.

Figure 9:
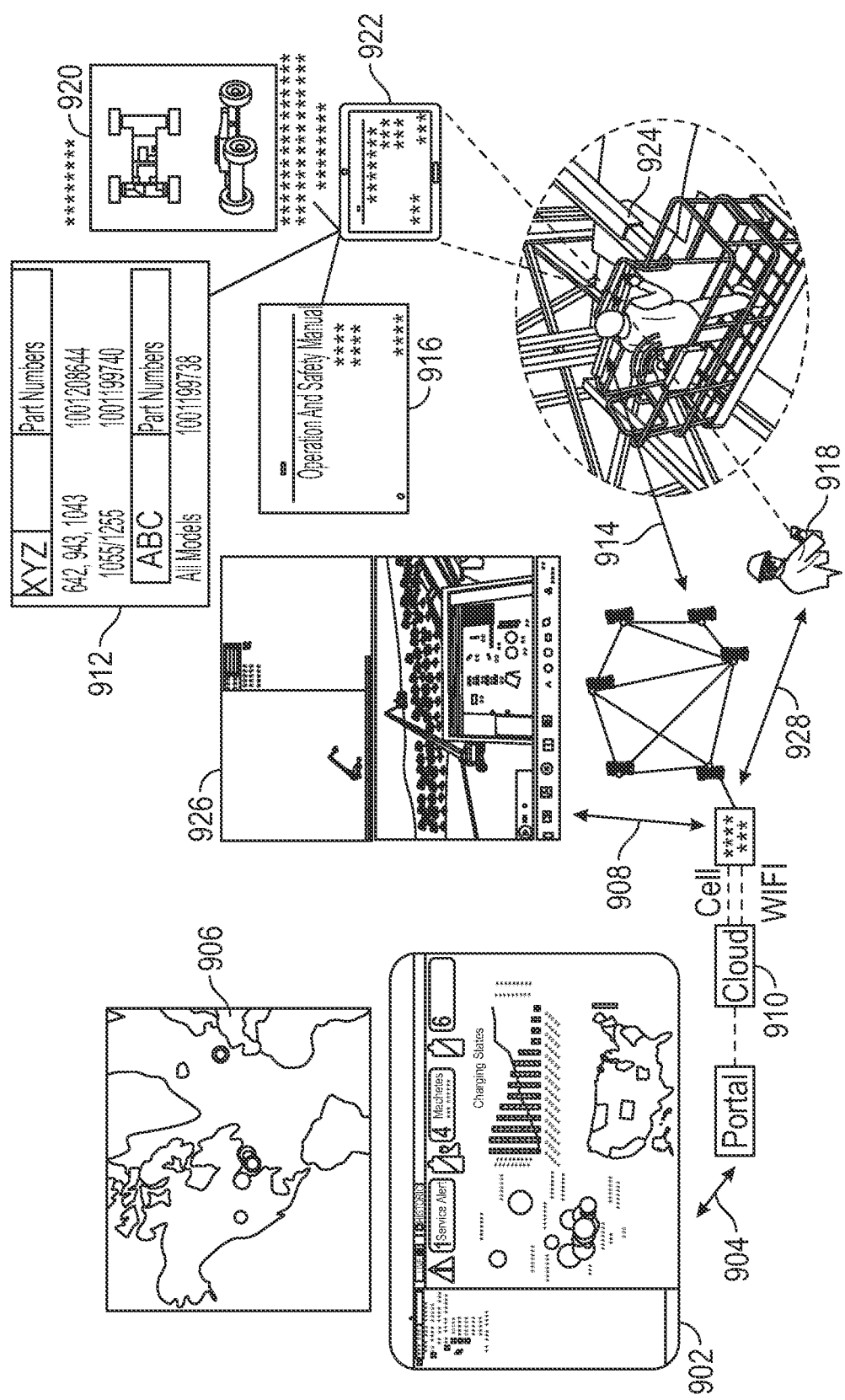
FIG. 9 is a picture representation of various graphical user interfaces associated with the local fleet connectivity system of FIG. 2, according to some embodiments.

As shown in FIG. 9, various user interfaces are available to be displayed on a remote user device 918 and an onboard display 922 of a work machine 924. A connectivity hub 910 may send and receive data 928, 908, 904 914 including the user interfaces 902, 906, 912, 916, 926, 920. The user interface 906 is a heat map of locations of a plurality of work machines. The user interface 902 is a machine status display that shows the battery level, location, and alerts relating to a plurality of work machines. User interface 926 shows a digital twin of a work machine that updates based on sensor data of an associated work machine. User interface 912 is a list of part numbers for the work machine 924. User interface 916 is an operation and safety manual for the work machine 924. User interface 920 is a detailed schematic of the work machine 924.

Figure 10:
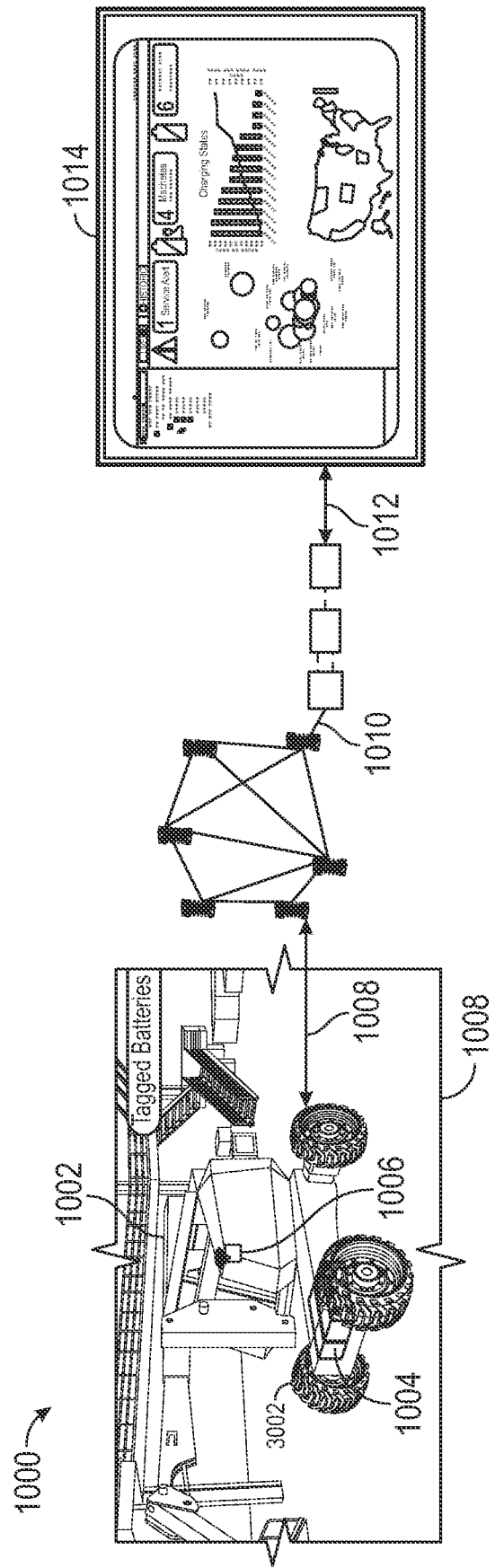
FIG. 10 is a picture representation of a work machine with machine specific output data connected to the local fleet connectivity system of FIG. 2, according to some embodiments.

As shown in FIG. 10, a tagged consumable tracking system 1000 is shown. A work machine 1002 on a jobsite 1008 includes tagged consumables 1004 (e.g., batteries connected to battery charger 1006). The machine 1002 sends and receives data 1008 to and from the connectivity hub 1010. The connectivity hub 1010 sends and receives data 1012 to and from a remote device and produces a user interface 1014. Data regarding the tagged consumables 1004 may be communicated via the user interface 1014 via the connectivity hub 1010. For example, battery charge state and battery health may be displayed via the user interface 1014. When the battery health falls below a predetermined state, for example, when the battery is only able to hold half of its original charge, the connectivity hub 1010 may send an alert via the user interface 1014 indicating that the battery should be replaced.

Figure 11:
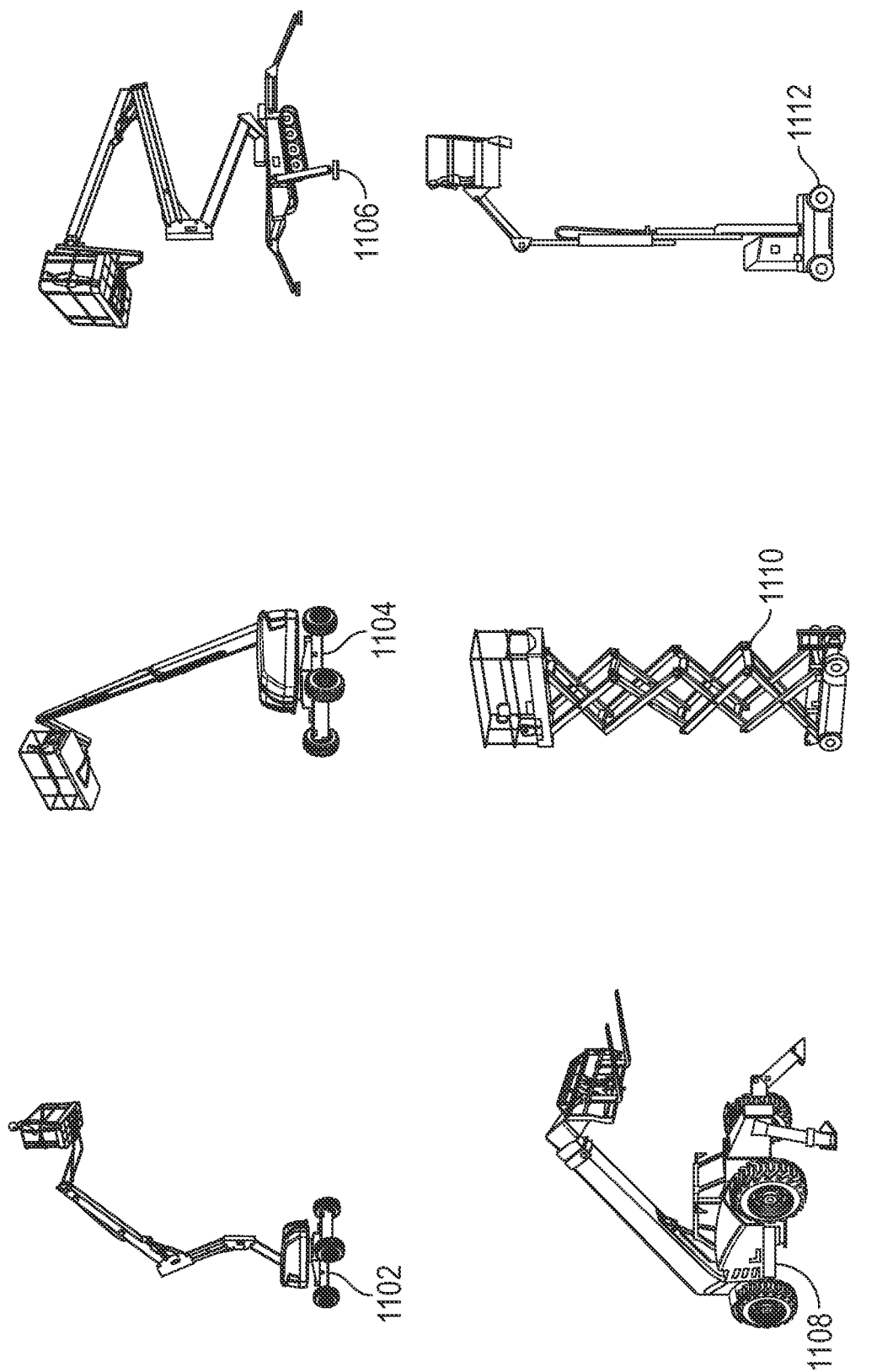
FIG. 11 is a picture representation of work machines configured for use in the local fleet connectivity system of FIG. 2, according to some embodiments.

As shown in FIG. 11, the local fleet connectivity systems and methods described above may be implemented using various work machines 20 such as an articulating boom lift 1102 as shown in FIG. 11, a telescoping boom lift 1104 as shown in FIG. 11, a compact crawler boom lift 1106 as shown in FIG. 11, a telehandler 1108 as shown in FIG. 11, a scissor lift 506, 508, and 1110 as shown in FIGS. 5 and 11, and/or a toucan mast boom lift 1112 as shown in FIG. 11.

According to the exemplary embodiment shown in FIG. 11, the work machines 20 (e.g., a lift devices, articulating boom lift 1102, telescoping boom lift 1104, compact crawler boom list 1106, telehandler 1108, scissor lift 1110, toucan mast boom lift 1112) include a chassis (e.g., a lift base), which supports a rotatable structure (e.g., a turntable, etc.) and a boom assembly (e.g., boom). According to an exemplary embodiment, the turntable is rotatable relative to the lift base. According to an exemplary embodiment, the turntable includes a counterweight positioned at a rear of the turntable. In other embodiments, the counterweight is otherwise positioned and/or at least a portion of the weight thereof is otherwise distributed throughout the work machines 20 (e.g., on the lift base, on a portion of the boom, etc.). As shown in FIG. 11, a first end (e.g., front end) of the lift base is supported by a first plurality of tractive elements (e.g., wheels, etc.), and an opposing second end (e.g., rear end) of the lift base is supported by a second plurality of tractive elements (e.g., wheels). According to the exemplary embodiment shown in FIG. 11, the front tractive elements and the rear tractive elements include wheels; however, in other embodiments the tractive elements include a track element.

As shown in FIG. 11, the boom includes a first boom section (e.g., lower boom, etc.) and a second boom section (e.g., upper boom, etc.). In other embodiments, the boom includes a different number and/or arrangement of boom sections (e.g., one, three, etc.). According to an exemplary embodiment, the boom is an articulating boom assembly. In one embodiment, the upper boom is shorter in length than lower boom. In other embodiments, the upper boom is longer in length than the lower boom. According to another exemplary embodiment, the boom is a telescopic, articulating boom assembly. By way of example, the upper boom and/or the lower boom may include a plurality of telescoping boom sections that are configured to extend and retract along a longitudinal centerline thereof to selectively increase and decrease a length of the boom.

As shown in FIG. 11, the lower boom has a first end (e.g., base end, etc.) and an opposing second end (e.g., intermediate end). According to an exemplary embodiment, the base end of the lower boom is pivotally coupled (e.g., pinned, etc.) to the turntable at a joint (e.g., lower boom pivot, etc.). As shown in FIG. 11, the boom includes a first actuator (e.g., pneumatic cylinder, electric actuator, hydraulic cylinder, etc.), which has a first end coupled to the turntable and an opposing second end coupled to the lower boom. According to an exemplary embodiment, the first actuator is positioned to raise and lower the lower boom relative to the turntable about the lower boom pivot.

As shown in FIG. 11, the upper boom has a first end (e.g., intermediate end, etc.), and an opposing second end (e.g., implement end, etc.). According to an exemplary embodiment, the intermediate end of the upper boom is pivotally coupled (e.g., pinned, etc.) to the intermediate end of the lower boom at a joint (e.g., upper boom pivot, etc.). As shown in FIG. 11, the boom includes an implement (e.g., platform assembly) coupled to the implement end of the upper boom with an extension arm (e.g., jib arm, etc.). In some embodiments, the jib arm is configured to facilitate pivoting the platform assembly about a lateral axis (e.g., pivot the platform assembly up and down, etc.). In some embodiments, the jib arm is configured to facilitate pivoting the platform assembly about a vertical axis (e.g., pivot the platform assembly left and right, etc.). In some embodiments, the jib arm is configured to facilitate extending and retracting the platform assembly relative to the implement end of the upper boom. As shown in FIG. 11, the boom includes a second actuator (e.g., pneumatic cylinder, electric actuator, hydraulic cylinder, etc.). According to an exemplary embodiment, the second actuator is positioned to actuate (e.g., lift, rotate, elevate, etc.) the upper boom and the platform assembly relative to the lower boom about the upper boom pivot.

According to an exemplary embodiment, the platform assembly is a structure that is particularly configured to support one or more workers. In some embodiments, the platform assembly includes an accessory or tool configured for use by a worker. Such tools may include pneumatic tools (e.g., impact wrench, airbrush, nail gun, ratchet, etc.), plasma cutters, welders, spotlights, etc. In some embodiments, the platform assembly includes a control panel to control operation of the work machines 20 (e.g., the turntable, the boom, etc.) from the platform assembly. In other embodiments, the platform assembly includes or is replaced with an accessory and/or tool (e.g., forklift forks, etc.).

Figure 12:
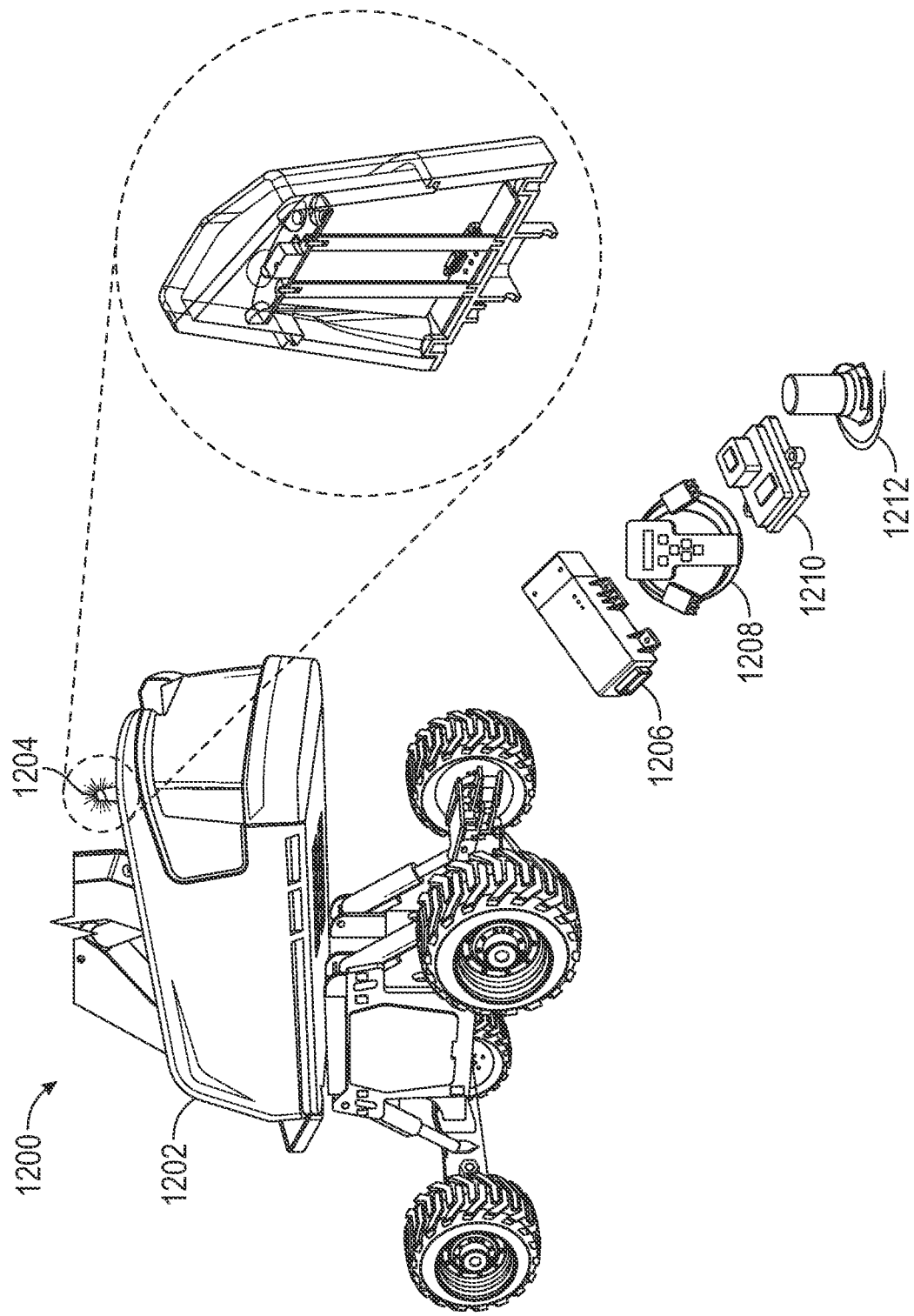
FIG. 12 is a picture representation of a work machine provisioned with an integrated connectivity module and beacon, according to an exemplary embodiment.

Referring now to FIG. 12, a work machine 1202 may be provisioned with an integrated connectivity module 1204 configured to connect to the local fleet connectivity system 1200. The integrated connectivity module 1204 may be configured to perform the functions of multiple devices that are often installed as separate components in traditionally provisioned work machines 1202. The functions and components provided in the integrated connectivity module 1204 can include telematics 1206, analytics 1208, communications 1210, visual and aural indicators 1212 (e.g., a warning beacon), etc.

Figure 13:
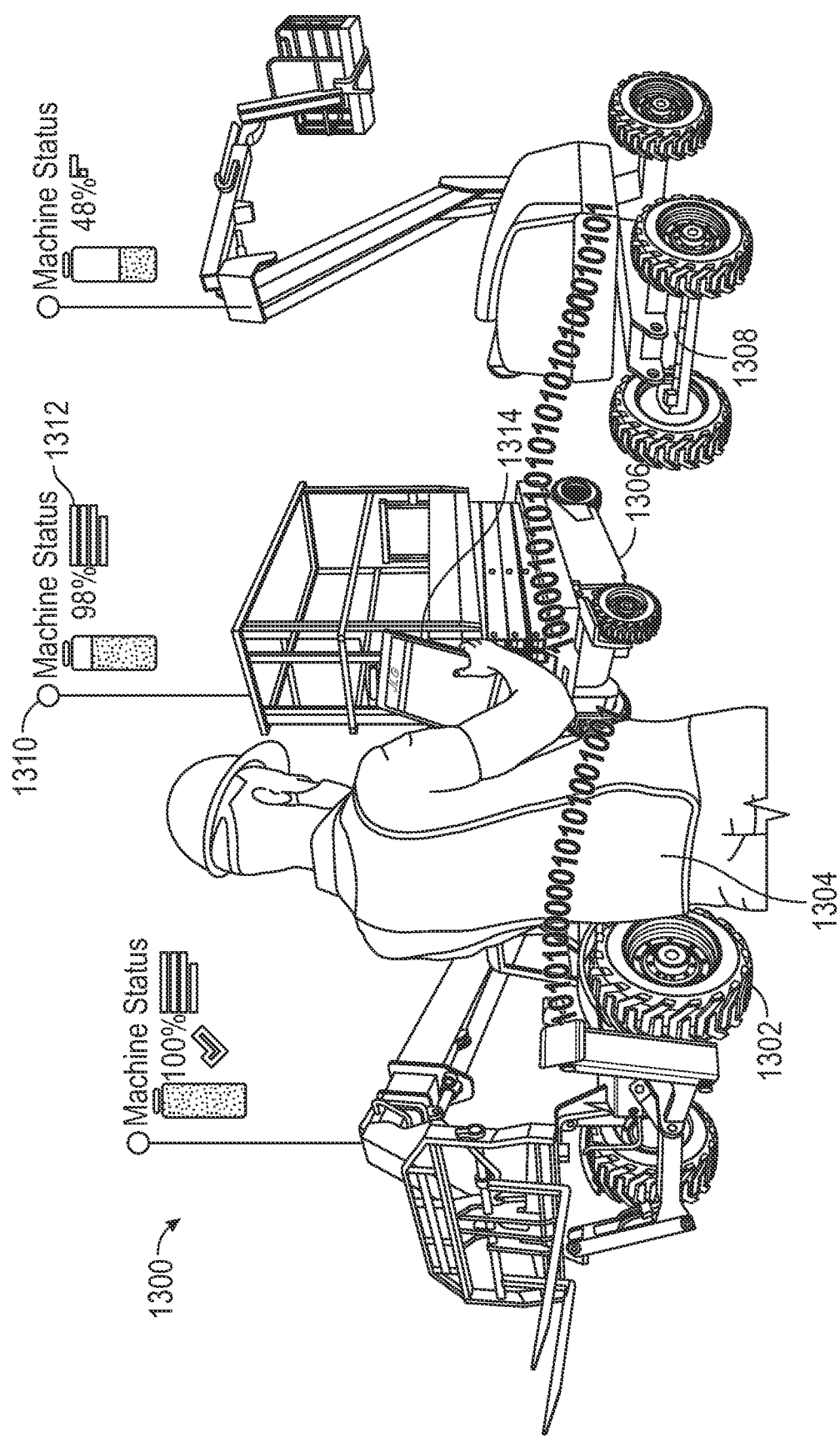
FIG. 13 is a combined picture and drawing representation of a work site fleet of work machines and a user device connected to the local fleet connectivity system of FIG. 2, according to an exemplary embodiment.

Referring now to FIG. 13, work machines 1302, 1306, 1308 equipped with connectivity modules 218 may form a local fleet connectivity network at a work site with machines 1302, 1306, 1308 and user devices 1314 acting as nodes 1310 on the network. The local fleet connectivity network at a work site connects to the local fleet connectivity system and provides machines 1302, 1306, 1308 and users 1304 access to data shared via the local fleet connectivity system. Available data include, for example, machine statuses 1312 (e.g., battery life, malfunctioning parts, etc.), machine locations, machine availability, etc.

Figure 14:
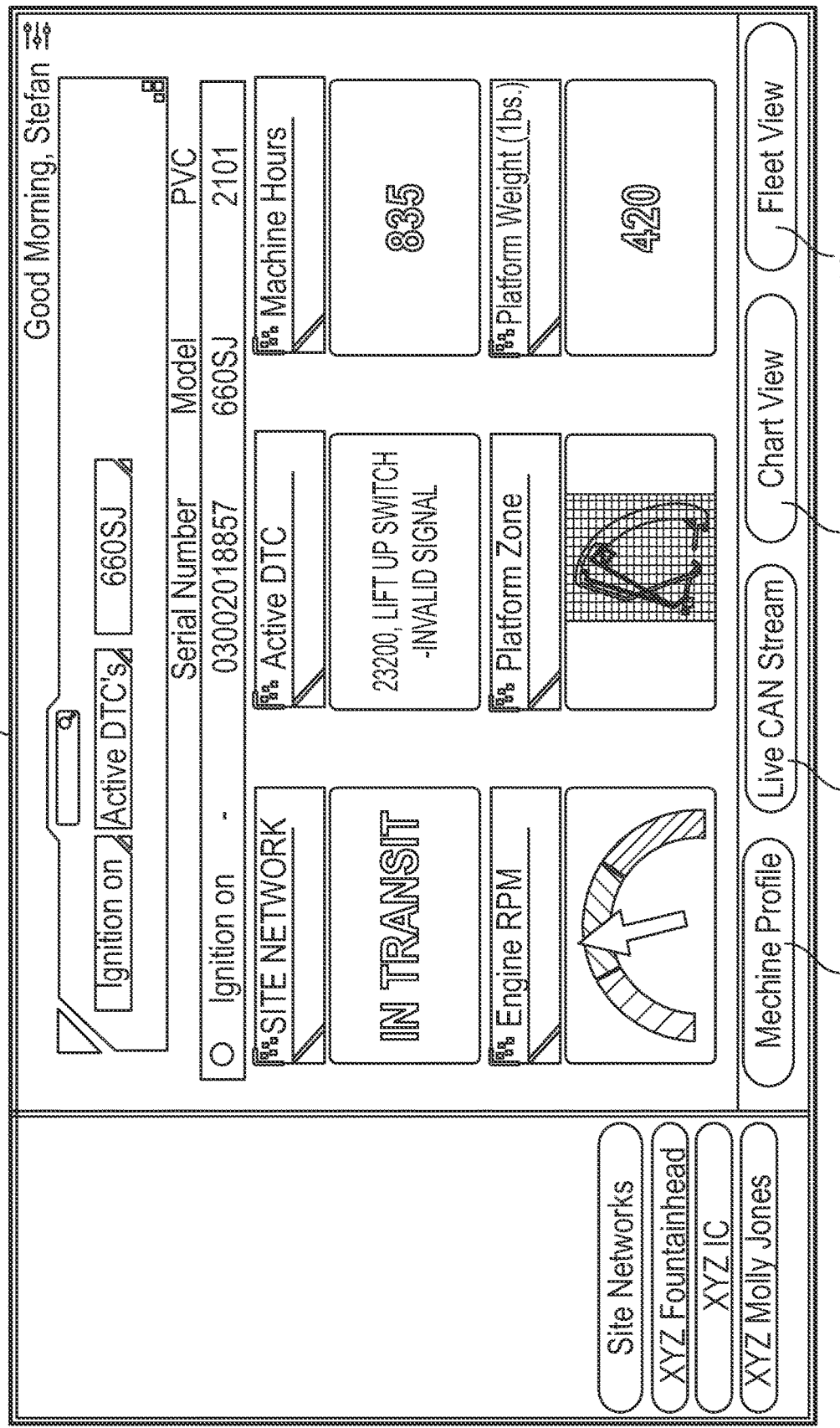
FIG. 14 is a picture representation of a user interface of the local machine connectivity system of FIG. 2, according to an exemplary embodiment.

Referring now to FIG. 14, the local fleet connectivity system 200 may generate user interface 1400. The user interface 1400 may be presented to the user as a user view 1410 depending on the role of the user and the nature of a task. The user view may include textual and graphic representations of, for example, a machine profile 1402, a machine databus stream 1404, a machine position, configuration, or state 1406, data related to a fleet of machines 1408, etc.

Figure 15:
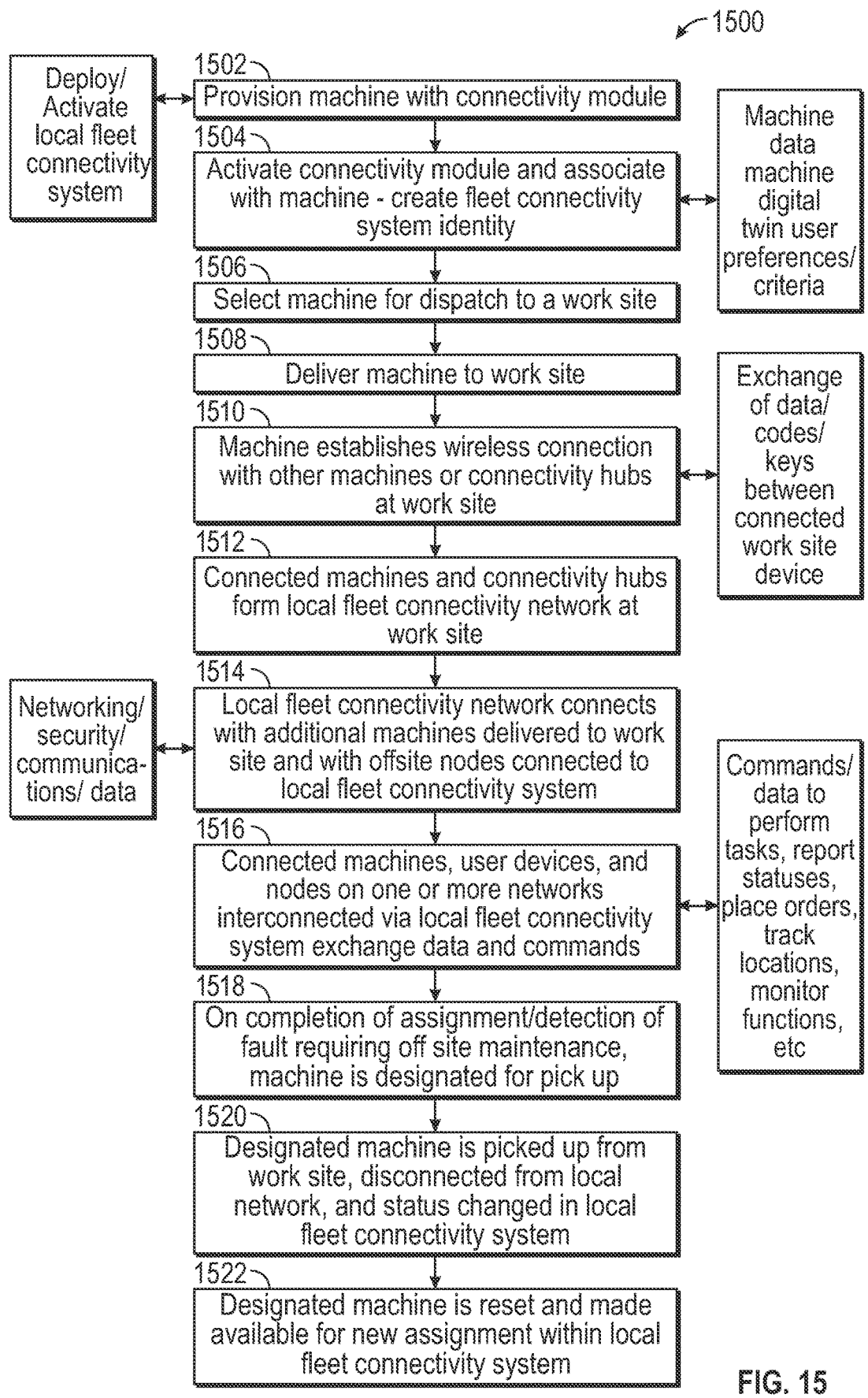
FIG. 15 is a flow chart of an exemplary embodiment of a process to deploy the local machine connectivity system of FIG. 2, according to some embodiments.

Referring now to FIG. 15, in some embodiments, a method 1500 for providing local fleet connectivity for groups of work machines associated with one or more work sites includes, at operation 1502, providing a machine with a connectivity module. The connectivity module enables the machine to communicably connect with other devices such that data, commands, etc. can be exchanged. For example, a machine with the connectivity module may send data to another device (e.g., a user device) regarding the machine's battery level, whether any parts of the machine need repair or a replacement, how long the machine has been in use, etc. At operation 1504, the connectivity module is activated and associated with the machine. Activation and association of the connectivity module may provide system level visibility to a digital twin of the machine, machine location, status, and digital records for the machine that are stored onboard the machine or remotely. User access to machine control and machine data may be provided according to access permissions. In some embodiments, only a subset of the data related to the machine is accessible to the user. For example, an operator may only be able to access current operational status of the machine (e.g., current battery level), while the manufacturer may be able to access historical operational statuses of the machine (hours of work performed on a single battery charge). The data accessible by the user may be determined based on an access indictor used to access the data. The access indicator may be any information indicative of an association of the machine with the user. For example, the access indicator may be an access code, a customer key, user credentials (user name and password), identification information, the type of account being used (e.g., customer account, manufacturer account, technician account, etc.), etc. For example, if the account used to access the data is associated to an individual operator, only the current operational status may appear. If the account is associated with the company that manufactured the machine, different information may be accessible. A memory device of control module may store instructions regarding which machines are associated with which access indicator. The control module 44 may be configured to compare the access indicator with the instructions stored in the memory device.

In some embodiments, at operation 1506, the machine is selected for dispatch to a work site. At operation 1508, the machine is delivered to the work site. At operation 1510, the machine links (e.g., communicably connects) with other machines or connectivity hubs at the work site by establishing a wireless connection with the other machines or connectivity hubs. Operation 1510 may include establishing, by at least one control module via at least one connectivity module, a connection between a plurality of machines disposed at a location. The link between a plurality of machines enables an exchange of data, codes, keys, etc. between the connected machines. In some embodiments, establishing the connection may be performed automatically. For example, when the machine arrives at the work site, the control module may detect a plurality of machines disposed at a location. In some embodiments, the machine may connect with all the detected machines. In other embodiments, the machine may only connect with a subset of the detected machines. A control module of a machine may receive input indicating which machines it may connect to. For example, only machines of the same type (e.g., boom lifts) may connect, only machines made by the same manufacturer may connect, or only machines within a predetermined geographical area may connect to each other. For example, a control module of the machine may receive an input identifying a designated geographical area on a map that corresponds to a work site. The input may indicate that any machine disposed within the designated geographical area may be connected with each other. In other words, the input may define the boundaries of the local fleet connectivity system. In another example, the input may indicate that any machine within a predetermined radius may connect with each other.

In other embodiments, the machine may connect with other machines based on an identification or classification of the machine. The classification may be based on a variety of factors including, but not limited to, a phase of a project the machine is being used for (e.g., a phase I machine), type of machine (e.g., boom lift, telehandler, scissor lift, etc.), size of machine (e.g., based on weight, dimensions, load capacity, etc.), who is authorized to use the machine (e.g., all machines operated by person A can be connected), etc. For example, a first subset of machines may be identified as A machines and a second subset of machines may be identified as B machines. The control module may identify a classification of each of the plurality of machines. The control module may then determine which of the plurality of machines have a classification that matches the classification of the delivered machine. Responsive to determining which of the plurality of machines have matching classifications, the control module may link the plurality of machines that have the matching classifications together via at least one connectivity module.

Data, codes, keys, etc. may be shared among the connected machines in order to facilitate the combination and organization of information regarding all of the machines. For example, once connected, a person authorized to access all information regarding the group of machines will have access to the information regarding all of the connected machines (e.g., locations, statuses, repair requirements, etc.) without having to search for each machine individually.

At operation 1512, the connected machines and connectivity hubs form a local fleet connectivity network at the work site. Each of the machines and hubs may comprise a node of the local fleet connectivity network. At operation 1514, the local fleet connectivity network connects with additional machines and network devices (e.g., a user device) delivered to the work site and with offsite nodes connected to the local fleet connectivity system. Connecting to the offsite notes enables the machines to provide data to devices at a remote location. For example, when a machine malfunctions, a notification may be transmitted to a technician at a remote location via a user device. The notification, via an application associated with the connectivity module, may provide the technician with specific details regarding the specific machine and the specific malfunction (e.g., components of the machine that need to be replaced, how to fix the problem, where to buy parts, etc.).

In some embodiments, at operation 1516, connected machines, user devices, and nodes on one or more networks interconnected via the local fleet connectivity system exchange data and commands. The exchange of data and commands may enable the system to perform tasks, report statuses, place orders, track locations, monitor functions, etc. according to system provided permissions. For example, the system may be able to receive inputs and provide outputs based on the type of account that is being used to access the machine. For example, an operator working at a work site may be able to perform different tasks and view different data than a technician or manufacturer of the machine. In some embodiments, a machine accessed by the operator may be able to track locations of all the connected machines at the specific work site, while a machine accessed by the manufacturer may be able to track locations of all connected machines at any work site. For another example, a machine accessed by the operator may be able to transmit a signal indicating a malfunction in the machine. The machine accessed by a technician may be able to access details regarding the malfunction, troubleshoot the malfunction, access instructions on how to best fix the malfunction, and assist in ordering parts required to repair the machine based on the malfunction.

In some embodiments, at operation 1516, a control module of a machine may receive, via a connectivity module, a command from at last one user device The command may include a task to be performed. Based on the command the control module may activate the machine to perform the task. For example, the task may be for the machine to move from a first location at a work site to a second location at a work site. The control module may activate an engine of the machine such that the machine moves to the identified location. In some embodiments, instead of completing a task, the control module may determine the machine is not capable of performing the task. For example, the control module 44 may determine a battery level is too low, a part of the machine is broken or missing, the machine is not equipped to perform the task (e.g., the boom of the boom lift is not long enough, the load of the task exceeds the load capacity of the machine, etc.), etc. For example, to detect a low batter level, the control module 44 may receive a low voltage or no voltage indicating that the machine has no, or too little, power. To detect a load exceeds the load capacity of the machine, the control module 44 may receive an indication from a sensor (e.g., a pressure sensor) that the pressure applied to the machine 202 is above the predetermine load capacity. Other sensors on the machine 202 may indicate when a part is broken or missing.

Responsive to determining the machine 202 is not capable of performing the task indicated by the command, the control module 44 may generate a notification indicating the machine is not capable of performing the task. The notification may include details regarding the specific machine (e.g., machine number, time spent at the location, specific location of machine at the location, load capacity, etc.). The notification may include details regarding the task indicated by the command. The notification may include details regarding why the machine is not capable of performing the task (e.g., broken parts, wrong machine, low battery, etc.). If the machine malfunctioned (broken part, low battery, parts aren't moving properly, etc.), the notification may include instructions on how to fix the problem, which part needs repair, where to buy a replacement part, etc. The control module 44 may transmit the notification to a user device, or other network device, to notify a user of the inability to perform the task.

In some embodiments, the control module 44, via the connectivity module 218, may identify a different machine that is capable of performing the task indicated by the command. For example, the control module 44 may receive data from a second machine 202 indicating all parts are functioning properly (e.g., data from a self-inspection from the second machine 202), the battery is fully charged, the load capacity exceeds the load of the task, etc. The control module 44 may recommend the second machine 202 as a replacement for the first machine 202 to the user device. In another embodiment, the control module 44 may automatically send, via the connectivity module 218, the command to the second machine 202.

In another embodiment, when the control module 44 determines a machine 202 is malfunctioning, the control module 44 may designate the machine 202 as inoperable. Based on the designation, the control module 44 may actuate a visual indicator (e.g., a light, a beacon, etc.). The visual indicator may be indicative of an inoperable state. In some embodiments, a specific visual indicator may correspond to a specific malfunction. For example, the control module 44 may change a color of a light, change a pulse of the light, change the number of lights, etc. based on what caused the malfunction. For example, a steady red light may indicate a low battery and a flashing red light may indicate a broken part.

In some embodiments, at operation 1518, at the completion of an assignment or at the detection of a fault condition requiring off site maintenance, the machine is designated for pick up. In some embodiments, the machine may send a notification to a remote user device indicating that the machine is to be removed from the work site. At operation 1520, the designated machine is picked up at the work site. Upon pick up, the machine may be disconnected from the local network. The disconnection may be done manually (e.g., user turns off or disengages the connectivity module of the machine) or automatically (e.g., machine determines it is no longer on the work site and disconnects from the network). For example, the control module 44 may have a GPS system that can determine when the machine 202 is no longer at the site. Upon removal, the control module 44 may be configured to disconnect the machine from the other machines at disposed at the location. In some embodiments, a new status of the machine is identified in the local fleet connectivity system. For example, when connected to the local fleet connectivity system, the machine may indicate a status of connected, operational, ready, etc. Upon disconnection, the machine may indicate status of disconnected, inoperable, being serviced, etc.

In some embodiments, at operation 1522, the designated machine is reset (e.g. fueled, charged, serviced, repaired, upgraded, etc.) and made available for a new assignment within the local fleet connectivity system. In some embodiments, the machine may be returned to the same work site and connected to the same local fleet connectivity system. In other embodiments, the machine may be sent to a new work site and connected to a new local fleet connectivity system. Method 1500 may be performed any number of times for any machine, and can include any number of local fleet connectivity systems.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using one or more separate intervening members, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic. For example, circuit A communicably "coupled" to circuit B may signify that the circuit A communicates directly with circuit B (i.e., no intermediary) or communicates indirectly with circuit B (e.g., through one or more intermediaries).

While various circuits with particular functionality are shown in FIGS. 1-3, it should be understood that the controller 44 may include any number of circuits for completing the functions described herein. For example, the activities and functionalities of the control system 60 may be combined in multiple circuits or as a single circuit. Additional circuits with additional functionality may also be included. Further, the controller 44 may further control other activity beyond the scope of the present disclosure.

As mentioned above and in one configuration, the "circuits" of the control system 60 may be implemented in machine-readable medium for execution by various types of processors, such as the processor 52 of FIG. 1. An identified circuit of executable code may, for instance, include one or more physical or logical blocks of computer instructions, which may, for instance, be organized as an object, procedure, or function. Nevertheless, the executables of an identified circuit need not be physically located together, but may include disparate instructions stored in different locations which, when joined logically together, form the circuit and achieve the stated purpose for the circuit. Indeed, a circuit of computer readable program code may be a single instruction, or many instructions, and may even be distributed over several different code segments, among different programs, and across several memory devices. Similarly, operational data may be identified and illustrated herein within circuits, and may be embodied in any suitable form and organized within any suitable type of data structure. The operational data may be collected as a single data set, or may be distributed over different locations including over different storage devices, and may exist, at least partially, merely as electronic signals on a system or network.

While the term "processor" is briefly defined above, the term "processor" and "processing circuit" are meant to be broadly interpreted. In this regard and as mentioned above, the "processor" may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can include RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

Although this description may discuss a specific order of method steps, the order of the steps may differ from what is outlined. Also, two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps, and decision steps.

References herein to the positions of elements (e.g., "top," "bottom," "above," "below," "between," etc.) are merely used to describe the orientation of various elements in the figures. It should be noted that the orientation of various elements may differ according to other exemplary embodiments, and that such variations are intended to be encompassed by the present disclosure.

Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claims.

What is claimed is:

1. A local fleet connectivity system, comprising:
a plurality of machines disposed at a location, each of the plurality of machines comprising an implement and a prime mover configured to drive the implement;
at least one control module communicably coupled with a first machine of the plurality of machines; and
at least one connectivity module communicably coupled with the plurality of machines;
wherein the at least one control module is configured to:
establish, via the at least one connectivity module, a connection between the plurality of machines;
detect the plurality of machines disposed at the location;
identify a classification of each of the plurality of machines;
determine which of the plurality of machines have corresponding classifications;
responsive to the determination of which of the plurality of machines have the corresponding classifications, link the plurality of machines that have the corresponding classifications together via the at least one connectivity module; and
exchange, via the at least one connectivity module, data between the plurality of machines.

2. The system of claim 1, wherein the at least one control module is further configured to:
receive, via the at least one connectivity module, a command to perform a task; and
activate a first machine of the plurality of machines to perform the task indicated by the command.

3. The system of claim 2, wherein the command comprises moving the first machine from a first position to a second position.

4. The system of claim 2, wherein the at least one control module is further configured to:
determine the first machine of the plurality of machines cannot perform the task indicated by the command;
generate a notification indicating the first machine of the plurality of machines cannot perform the task indicated by the command, the notification comprising details corresponding to the first machine; and
transmit, via the at least one connectivity module, the notification to at least one user device.

5. The system of claim 4, wherein the at least one control module is further configured to:
designate the first machine of the plurality of machines as inoperable based on determining the first machine of the plurality of machines cannot perform the task indicated by the command;
identify, via the at least one connectivity module, a second machine of the plurality of machines that is capable of performing the task indicated by the command; and
recommend, via the at least one connectivity module, the second machine as a replacement for the first machine to the at least one user device.

6. The system of claim 5, wherein the at least one control module is further configured to actuate a visual indicator responsive to the designation of the first machine as inoperable, wherein the visual indicator is indicative of an inoperable state.

7. The system of claim 5, wherein the at least one control module is further configured to:
determine the first machine is not disposed at the location; and
disconnect the first machine from the plurality of machines disposed at the location.

8. The system of claim 1, wherein the at least one control module is further configured to:
receive, via the at least one connectivity module, a request from at least one user device to access machine-specific data corresponding to the plurality of machines, wherein the request comprises an access indicator;
identify at least one of the plurality of machines that is associated with the access indicator; and
provide, via the at least one connectivity module, machine-specific data corresponding to the at least one of the plurality of machines to the at least one user device.

9. The system of claim 1, wherein the at least one control module is further configured to:
receive, via the at least one connectivity module, a request from at least one user device to access machine-specific data corresponding to the plurality of machines, wherein the request comprises an access indicator;
identify a subset of the machine-specific data that is associated with the access indicator; and
provide, via the at least one connectivity module, the subset of the machine-specific data to the at least one user device.

10. A method, comprising:
establishing, by at least one control module via at least one connectivity module, a connection between a plurality of machines disposed at a location, wherein establishing the connection between the plurality of machines comprises:
detecting, by the at least one control module, the plurality of machines disposed at the location;
identifying, by the at least one control module, a classification of each of the plurality of machines;
determining, by the at least one control module, which of the plurality of machines have corresponding classifications; and
responsive to determining which of the plurality of machines have the corresponding classifications, linking the plurality of machines that have the corresponding classifications together via the at least one connectivity module; and
exchanging, by the at least one control module via the at least one connectivity module, data between the plurality of machines,
wherein each of the plurality of machines comprises an implement and a prime mover configured to drive the implement.

11. The method of claim 10, further comprising:
receiving, by the at least one control module via the at least one connectivity module, a command comprising a task to be performed; and
activating, by the at least one control module, a first machine of the plurality of machines to perform the task.

12. The method of claim 11, wherein the command comprises moving the first machine from a first position to a second position.

13. The method of claim 11, further comprising:
determining, by the at least one control module, the first machine of the plurality of machines cannot perform the task indicated by the command;
generating, by the at least one control module, a notification indicating the first machine of the plurality of machines cannot perform the task indicated by the command, the notification comprising details corresponding to the first machine; and transmitting, by the at least one control module via the at least one connectivity module, the notification to at least one user device.

14. The method of claim 13, further comprising:

identifying, by the at least one control module via the at least one connectivity module, a second machine of the plurality of machines that is capable of performing the task indicated by the command; and recommending, by the at least one control module via the at least one connectivity module, the second machine as a replacement for the first machine to the at least one user device.

15. The method of claim 14, further comprising:

determining, by the at least one control module, the first machine is malfunctioning;

designating, by the at least one control module, the first machine as inoperable based on determining the first machine is malfunctioning; and actuating, by the at least one control module, a visual indicator responsive to designating the first machine as inoperable, wherein the visual indicator is indicative of an inoperable state.

16. The method of claim 15, further comprising:

determining, by the at least one control module, the first machine removed from the location; and disconnecting, by the at least one control module, the first machine from the plurality of machines disposed at the location.

17. The method of claim 10, further comprising:

receiving, by the at least one control module via the at least one connectivity module, a request from at least one user device to access machine-specific data corresponding to the plurality of machines, wherein the request comprises an access indicator;

identifying, by the at least one control module, at least one of the plurality of machines that is associated with the access indicator; and providing, by the at least one control module via the at least one connectivity module, machine-specific data corresponding to the at least one of the plurality of machines to the at least one user device.

18. A non-transitory computer readable medium having computer-executable instructions embodied therein that, when executed by a processor of a control module, cause the control module to perform operations comprising:

establishing, via at least one connectivity module, a connection between a plurality of machines disposed at a location, wherein establishing the connection between the plurality of machines comprises:

detecting the plurality of machines disposed at the location;

identifying a classification of each of the plurality of machines;

determining which of the plurality of machines have corresponding classifications; and responsive to determining which of the plurality of machines have the corresponding classifications, linking the plurality of machines that have the corresponding classifications together via the at least one connectivity module; and exchanging, via the at least one connectivity module, data between the plurality of machines, wherein each of the plurality of machines comprises an implement and a prime mover configured to drive the implement.

* * * * *